(12) United States Patent
Nixon et al.

(10) Patent No.: US 12,190,216 B2
(45) Date of Patent: *Jan. 7, 2025

(54) INDUSTRIAL PROCESS CONTROL SYSTEM AS A DATA CENTER OF AN INDUSTRIAL PROCESS PLANT

(71) Applicant: FISHER-ROSEMOUNT SYSTEMS, INC., Round Rock, TX (US)

(72) Inventors: Mark J. Nixon, Thorndale, TX (US); Claudio Fayad, Austin, TX (US); Robert G. Halgren, III, Austin, TX (US); Anthony Amaro, Jr., Cedar Park, TX (US); Peter Hartmann, Austin, TX (US); Trevor Duncan Schleiss, Austin, TX (US); Seshatre Natarajan, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,927

(22) Filed: Nov. 21, 2023

(65) Prior Publication Data

US 2024/0086778 A1    Mar. 14, 2024

Related U.S. Application Data

(63) Continuation of application No. 17/077,888, filed on Oct. 22, 2020, now Pat. No. 11,875,236.

(51) Int. Cl.
*G06N 20/00* (2019.01)
*G05B 19/4155* (2006.01)
(Continued)

(52) U.S. Cl.
CPC ......... *G06N 20/00* (2019.01); *G05B 19/4155* (2013.01); *G06F 13/38* (2013.01); *G05B 2219/31449* (2013.01); *G06F 2213/40* (2013.01)

(58) Field of Classification Search
CPC .............. G06N 20/00; G06N 2213/40; G05B 19/4155; G05B 2219/31449;
(Continued)

(56) References Cited

U.S. PATENT DOCUMENTS 10,311,015 B2    6/2019  Nixon et al.
11,875,236 B2 *  1/2024  Nixon ................... G06N 20/00
(Continued)

FOREIGN PATENT DOCUMENTS

GB      2 403 043 A       12/2004
WO      WO-98/36335 A2     8/1998
WO      WO-2017/066304 A1  4/2017

OTHER PUBLICATIONS

Deep Learning Server for AI Research, Nvidia Corporation, 2020, <https://www.nvidia.com/en-us/data-center/dgx-1/>, 5 pages.
(Continued)

*Primary Examiner* — Michael J Brown
(74) *Attorney, Agent, or Firm* — MARSHALL, GERSTEIN & BORUN LLP

(57) ABSTRACT

A distributed control system (DCS) of an industrial process plant includes a data center storing a plant information model that includes a description of physical components, the control framework, and the control network of the plant using a modeling language. A set of exposed APIs provides DCS applications access to the model, and to an optional generic framework of the data center which stores basic structures and functions from which the DCS may automatically generate other structures and functions to populate the
(Continued)

model and to automatically create various applications and routines utilized during run-time operations of the DCS and plant. Upon initialization, the DCS may automatically sense the I/O types of its interface ports, detect communicatively connected physical components within the plant, and automatically populate the plant information model accordingly. The DCS may optionally automatically generate related control routines and/or I/O data delivery mechanisms, HMI routines, and the like.

20 Claims, 3 Drawing Sheets

(51) Int. Cl.
*G06F 13/38* (2006.01)
*G05B 19/05* (2006.01)
*G05B 19/41* (2006.01)

(58) Field of Classification Search
CPC .... G05B 19/41845; G05B 2219/33125; G05B 19/41875; G05B 2219/32368; G05B 19/418; G05B 19/054; G06F 13/38; Y02P 90/02
USPC .......................................................... 700/28
See application file for complete search history.

(56) References Cited

U.S. PATENT DOCUMENTS

| | | |
|---|---|---|
| 2015/0005903 A1 | 1/2015 | Worek et al. |
| 2016/0364282 A1 | 12/2016 | Baron et al. |
| 2017/0235691 A1 | 8/2017 | Xiao et al. |
| 2021/0208545 A1 | 7/2021 | Zhang et al. |

OTHER PUBLICATIONS

Search Report for Application No. GB2113966.2, dated Mar. 4, 2022.

* cited by examiner

INDUSTRIAL PROCESS CONTROL SYSTEM AS A DATA CENTER OF AN INDUSTRIAL PROCESS PLANT

CROSS-REFERENCE TO RELATED APPLICATIONS

This application is a continuation of U.S. patent application Ser. No. 17/077,888 entitled "Industrial Process Control System as a Data Center of an Industrial Process Plant" and filed on Oct. 22, 2020, the disclosure of which is hereby incorporated by reference herein in its entirety.

TECHNICAL FIELD

The present application relates generally to industrial process control systems of industrial process plants and, more particularly, to industrial process control systems that are data centers of industrial process plants.

BACKGROUND

Distributed industrial process control systems, like those used in chemical, petroleum, industrial or other process plants to manufacture, refine, transform, generate, or produce physical materials or products, typically include one or more process controllers communicatively coupled to one or more field devices via physical layers that may be analog, digital or combined analog/digital buses, or that may include one or more wireless communication links or networks. The field devices, which may be, for example, valves, valve positioners, switches and transmitters (e.g., temperature, pressure, level and flow rate sensors), are located within the process environment of the industrial process plant (which is interchangeably referred to herein as a "field environment" or a "plant environment" of the industrial process plant), and generally perform physical process control functions such as opening or closing valves, measuring process and/or environmental parameters such as flow, temperature or pressure, etc. to control one or more processes executing within the process plant or system. Smart field devices, such as the field devices conforming to the well-known FOUNDATION© Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a control routine or application that runs, for example, different control modules which utilize different control algorithms make process control decisions, generate process control signals based on the received information and coordinate with the control modules or blocks being performed in the field devices, such as HART®, WirelessHART®, and FOUNDATION© Fieldbus field devices. To perform this communication, the control modules in the process controller send the control signals to various different input/output (I/O) devices, which then send these control signals over specialized communication lines or links (communication physical layers) to the actual field devices to thereby control the operation of at least a portion of the process plant or system, e.g., to control at least a portion of one or more industrial processes running or executing within the plant or system. The I/O devices, which are also typically located within the plant environment, are generally disposed between a process controller and one or more field devices, and enable communications there-between, e.g., by converting electrical signals into digital values and vice versa. Different I/O devices are provided to support field devices that use different specialized communication protocols. More particularly, a different I/O device is provided between a process controller and each of the field devices that uses a particular communication protocol, such that a first I/O device is used to support HART field devices, a second I/O device is used to support Fieldbus field devices, a third I/O device is used to support Profibus field devices, etc. As utilized herein, field devices, controllers, and I/O devices are generally referred to as "process control devices," and are generally located, disposed, or installed in a field environment of a process control system or plant.

Still further, information from the field devices and the process controller is usually made available through the process controllers over a data highway or communication network to one or more other hardware devices, such as operator workstations, personal computers or computing devices, data historians, report generators, centralized databases, or other centralized administrative computing devices that are typically placed in control rooms or other locations away from the harsher field environment of the plant, e.g., in a back-end environment of the process plant. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing process control software, keeping and updating a configuration database, etc. The data highway utilized by the hardware devices and process controllers may include a wired communication path, a wireless communication path, or a combination of wired and wireless communication paths, and typically uses a packet based communication protocol and non-time sensitive communication protocol, such as an Ethernet or IP protocol.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and to download these process control modules via a data highway to dedicated distributed controllers. Typically, these control modules are made up of communicatively interconnected function blocks, which may be objects in an object-oriented programming protocol that perform functions within the control scheme based on inputs thereto and that provide outputs to other function blocks within the control scheme. The configuration application may also allow a configuration engineer to create or change operator interfaces that are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As distributed industrial process control systems have evolved over time, different hardware, communication, and networking technologies were developed and added. As such, each new generation or iteration of hardware, communication, and/or networking technology typically had to integrate with and work seamlessly with fairly large embedded bases of process control devices, communication, and networking technologies of previous generations of industrial process control systems. Consequently, present day distributed industrial process control systems typically may support multiple types of analog and/or digital specialized process control communication protocols that are utilized by different types and/or generations of field devices (such as 4-20 ma, OPC Unified Architecture (OPC UA) Highway Addressable Remote Transducer (HART®), CAN, FOUNDATION® Fieldbus, PROFIBUS, WirelessHART®, HART-IP, etc.), and may also support multiple types of general communication and/or data protocols, such as Wi-Fi, Bluetooth, Ethernet, MQTT, AMQP, and/or other types of packet protocols, etc., at least some of which may be compliant with one or more IEEE (Institute of Electrical and Electronic Engineers) standards or data networking standards, each of which may be used to communicate and store various types of data related to the operations of the industrial process plant. Further, while an industrial process plant is supported by distributed industrial process control systems to control run-time operations, the industrial process plant is also supported by other systems to manage the plant, its equipment, and its processes (e.g., Plant Asset Management (PAM) systems, maintenance systems, diagnostic systems, simulation systems, remote monitoring and/or analytics systems, enterprise business systems, etc.), each of which may utilize its own set of communication and/or data protocols to communicate and store data related to the industrial process plant.

As such, the different fixed networking technologies utilized by a distributed industrial process control system and other systems that support an industrial plant makes it difficult, cumbersome, and costly for the plant to be scaled up or down in size, and makes it difficult, cumbersome, and costly for the industrial process control system to integrate with the other systems in peer-wise (e.g., horizontal) manner and/or in a layered (e.g., vertical) manner (such as with systems located at different layers or levels of security, e.g., with respect to the Purdue Model for Control Hierarchy standardized by the ISA (International Society of Automation), such as enterprise systems, remote systems, cloud-based systems, etc.), while maintaining stringent security requirements. Further, process plant related data which has been generated by disparate sources and communicated via disparate networks require significant amounts of data integration in order to be utilized by applications that provide actionable information to plant personnel which, in some cases, may drain processing power and network bandwidth.

SUMMARY

An industrial distributed process control system (DCS) provides a novel data center for an industrial process plant. More particularly, this novel process plant data center, to a large extent, decouples process plant related data from the fixed networking technologies of current day industrial process control systems and of other related horizontal and/or vertical systems (such as Plant Asset Management (PAM) systems, maintenance systems, diagnostic systems, simulation systems, remote monitoring and/or analytics systems, enterprise business systems, etc.), thereby providing ease of scalability and data integration of the industrial process plant, and providing ease of availability of process plant related data for application usage in a highly secured manner.

Generally speaking, the industrial process plant data center includes a plant information model which includes a representation or description of the physical industrial process plant, a representation or description of the control strategy utilized by the industrial process plant, and a representation or description of the industrial process control system, all of which are represented and/or described within the plant information model using a modeling language that is commonly utilized across all descriptions. Additionally, the process plant data center includes a generic framework that provides generic structures and generic functions which may be utilized, automatically or manually, as building blocks for other structures and functions, and applications utilized by the industrial distributed process control system. Further, the process plant data center exposes or otherwise provides application programming interfaces (APIs) which enable applications of the DCS to securely access and/or obtain the process plant information, generic structures, and/or generic functions for the applications' use.

In an embodiment, an industrial distributed process control system of an industrial process plant is disclosed. The industrial distributed process control system comprises a set of pluggable, interchangeable hardware modules, and each pluggable hardware module of the set includes a plurality of interface ports configured to deliver one or more types of I/O data utilized for industrial process control, one or more processors, and one or more tangible, non-transitory memories.

The one or more tangible, non-transitory memories of the each pluggable hardware module store a discovery engine comprising first computer-executable instructions that, when executed by the one or more processors, cause the each pluggable hardware module to automatically sense, upon a powering up of the each pluggable hardware module, a respective I/O type of each interface port included in the plurality of interface ports of the each pluggable hardware module; bind, to the each interface port, a respective I/O data delivery mechanism corresponding to the respective I/O type; and discover one or more physical components of the industrial process plant to which the each pluggable hardware module is communicatively connected via the plurality of interface ports. The one or more physical components which are communicatively connected to the each pluggable hardware module include a respective field device configured to perform a physical function to control an industrial process during run-time operations of the industrial process plant.

Additionally, the first computer-executable instructions of the discovery engine, when executed by the one or more processors, cause the each pluggable hardware module further to populate, based on the discovery of the one or more physical components, at least a portion of a plant information model of the DCS, where the plant information model includes a description of a control framework of the industrial process plant and a description of a control network of the industrial process plant utilized to control the industrial process during the run-time operations of the industrial process plant. The control framework of the industrial process plant defines respective logical control identifiers of control components of the DCS and hierarchical relationships among the control components, where the control components include the discovered field device. The control network includes the discovered field device, a respective interface port via which the field device is communicatively connected to the each pluggable hardware module, and a control routine provided at the each pluggable hardware module.

The one or more tangible, non-transitory memories of the each pluggable hardware module further store an execution engine comprising second computer-executable instructions that, when executed by the one or more processors, cause the each pluggable hardware module to execute the control routine and the respective I/O data delivery mechanism bound to the respective interface port to deliver data between the field device and the control routine to thereby control the industrial process.

In an embodiment, a method of initializing an industrial distributed process control system (DCS) of an industrial process plant is disclosed. The industrial distributed process control system includes a set of pluggable, interchangeable hardware modules, and the method comprises, at each pluggable hardware module: upon a powering up of the each pluggable hardware module, sensing, by the each pluggable hardware module, a respective I/O type of each interface port included in a plurality of interface ports included in the each pluggable hardware module; binding, by the each pluggable hardware module to the each interface port, a respective I/O data delivery mechanism corresponding to the respective I/O type; and discovering, by the each pluggable hardware module, one or more physical components of the industrial process plant to which the each pluggable hardware module is communicatively connected via the plurality of interface ports. The one or more physical components include a field device that is communicatively connected to the each pluggable hardware module via a respective interface port, and the field device is configured to perform a physical function to control an industrial process during run-time operations of the industrial process plant.

The method further comprises populating, based on the discovery of the one or more physical components by the each pluggable hardware module, at least a portion of a plant information model of the DCS, where the plant information model includes a description of a control framework of the industrial process plant and a description of a control network of the industrial process plant utilized to control the industrial process during the run-time operations of the industrial process plant. The control framework of the industrial process plant defines respective logical control identifiers of control components of the DCS and hierarchical relationships among the control components, where the field device is included in the control components. The control network includes the field device, the respective interface port, and a control routine provided at the each pluggable hardware module.

Additionally, the method comprises executing, by the each pluggable hardware module, the control routine and the respective I/O data delivery mechanism bound to the respective interface port to deliver data between the field device and the control routine to thereby control the industrial process.

In an embodiment, an industrial distributed process control system (DCS) of an industrial process plant is disclosed. The industrial distributed process control system comprises a data center that includes a plant information model stored on one or more tangible, non-transitory memories of the DCS. The plant information model describes, using a modeling language, (i) a set of physical components of the industrial process plant, where the description of the set of physical components indicates respective locations of the set of physical components and respective physical interconnections among the set of physical components; (ii) a control framework of the industrial process plant, where the control framework defines hierarchical relationships among a set of control components of the DCS and respective logical control identifiers of the set of control components, and the control components include at least some of the set of physical components; and (iii) a control network of the industrial process plant utilized to control an industrial process during the run-time operations of the industrial process plant, where the control network includes at least some of the set of control components.

The data center further includes a set of Application Programming Interfaces (APIs) stored on the one or more tangible, non-transitory memories of the DCS and exposed to at least one of a control routine or an I/O data delivery mechanism of the DCS to provide the at least one of the control routine or the I/O data delivery mechanism access to the plant information model via the modeling language, where the modeling language comprises abstractions of a plurality of data formats utilized by the DCS. The at least one of the control routine or the I/O data delivery mechanism executes in conjunction with a corresponding physical component disposed in the industrial process plant by utilizing information obtained from the plant information model to thereby control the industrial process during real-time operations of the industrial process plant.

DETAILED DESCRIPTION

Figure 1:
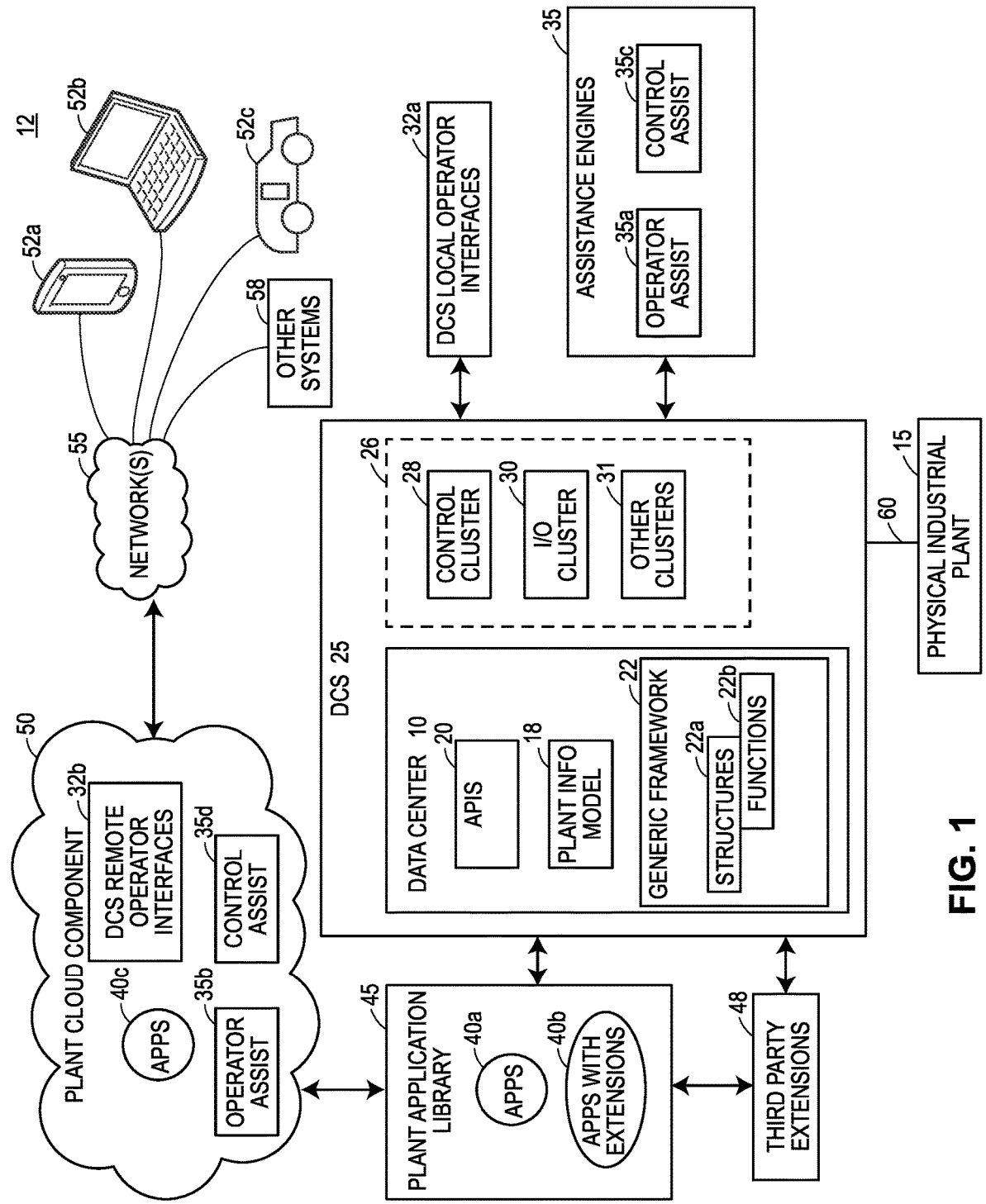
FIG. 1 depicts an example industrial process plant data center included in an industrial distributed process control system of an industrial process plant data ecosystem of a physical industrial process plant.

FIG. 1 depicts an example industrial process plant data center 10 within an industrial process plant data ecosystem 12 of a physical industrial process plant 15. As shown in FIG. 1, the process plant data center 10 includes a plant information model 18, a set of Application Programming Interfaces (APIs) 20, and a generic framework 22. The plant information model 18 provides, using a modeling language, a representation, description, or model of the physical industrial process plant 15, a representation, description, or model of a control framework utilized by the industrial process plant 15, and a representation, description, or model of a control network of the industrial process plant 15. Generally speaking, the plant information model 18 is the basis on which components of the plant ecosystem 12 describe, refer to, and communicate physical, logical, and/or control-related information and data related to the industrial process plant 15. As such the plant information model 18 describes the physical components, control framework, and control network of the industrial process plant in a uniform manner by using the modeling language, where the modeling language abstracts information from a plurality of data sources (e.g., from the physical components themselves, one or more data bases associated with the industrial process plant such as configuration databases, asset management databases, etc., and/or other data sources) to provide the descriptions in the plant information model 18 in a uniform manner using the modeling language. For example, the DCS 25 may convert or abstract data of various data formats obtained from the various data sources into the common modeling language utilized by the plant information model 18, and may store corresponding information in the plant information model using the modeling language. At least some of the plant information model 18 may be automatically generated and populated upon initialization of the industrial distributed control system (DCS) 25 in which the data center 10 is included, and upon physical connection of the DCS 25 to the industrial process plant 15, as is described in more detail elsewhere within this disclosure.

The generic framework 22 provided by the plant data center 10 includes a set of generic structures 22a and a set of generic functions 22b, which typically have been stored onto the memories of the data center 20 at some time prior to initialization of the data center 10. The generic structures 22a include generic structure templates for definitions and/or descriptions corresponding to various types of physical components of the industrial process plant 15 (such as controllers, sensors, pumps, valves, actuators, safety devices, I/O devices, routers, access points, etc.) as well as generic structure templates for definitions and/or descriptions corresponding to various types of logical and control components of the industrial process plant 15, such as blocks, parameters, I/O cards and/or other hardware components, nodes, node subsystems, etc. The generic functions 22b include a set of basic functions that are utilized in control and/or I/O data delivery. For example, the set of basic functions may include first-order generic control functions and first-order generic I/O functions (e.g., first-order generic "I/O data delivery functions") which may be directly utilized in process control routines, e.g., of the DCS 25, to control industrial processes. The generic functions 22b may also include second-order or support functions which do not directly perform process control or I/O data delivery in and of themselves, but otherwise may operate on data generated from control of the industrial process, e.g., alarming, monitoring, analytics, HMI, trends, etc. In some implementations, though, outputs from some of the generic support functions may impact the behavior of process control.

The data center 10 is included in a distributed industrial process control system (DCS) 25 of the industrial process plant 15, where the DCS 25 may include a control cluster 28 and an Input/Output (I/O) cluster 30 (which is interchangeably referred to herein as a "I/O data delivery cluster 30"). Generally speaking, the control cluster 28 and the I/O cluster 30 of the DCS 25 include respective sets of compute modules which, by utilizing the plant information model 18 and optionally the generic framework 22, operate in conjunction during run-time operations of the physical industrial process plant 15 to control one or more industrial processes of the industrial process plant 15.

In embodiments, the ecosystem 12 further includes a set of DCS operator user interfaces 32 which generally enable plant operators or users to view, monitor, adjust, and respond to run-time process operations of the plant 15. The DCS operator user interfaces 32 may include a set of local user interfaces 32a which execute at computing devices disposed in control rooms or other back-end environments of the physical industrial plant 15 which typically are shielded from the harsher field environments of physical industrial plant 15 in which the physical materials are being processed. Additionally or alternatively, the DCS operator user interfaces 32 may include a set of remote user interfaces 32b which execute remotely from the industrial process plant 15, e.g., in or associated with a cloud component 50 of the industrial process plant ecosystem 12. In some embodiments, the ecosystem 12 also includes one or more local and/or remote assistance engines 35 which provide intelligent assistance to the operator user interfaces 32a, 32b (e.g., operator assistance engines 35a, 35b) and/or to the DCS 25 control operations (e.g., control assistance engines 35c, 35d), as is described in more detail elsewhere in this disclosure. Although FIG. 1 depicts the DCS operator user interfaces 32a and assistance engines 35a, 35d as being separate from the DCS 25, in some embodiments, at least some of the DCS operator user interfaces 32a and/or assistance engines 35a, 35d are included in the DCS 25.

The set of the APIs 20 of the data center 10 is exposed or otherwise made available to a set of applications 40a which may utilize the APIs 20 to access plant information 18 and the generic framework 22 provided by the data center 10, e.g., by utilizing the common modeling language. Applications 40a may be stored in an application library 45 of the industrial process plant 15, for example. In some embodiments, one or more third-party extensions 48 may utilize at least some of the set of APIs 20 to access the plant information 18 and the generic framework 22, and applications 40b that utilize the third-party extensions 48 may also be stored in the plant application library 45. Some of the applications 40a, 40b stored in the library 45 may have instances which execute at the control cluster 28, the I/O cluster 30, and/or other clusters 31 (e.g., the compute clusters 26 of the DCS 25), for example. Some of the applications 40a, 40b may be DCS operator user interfaces 32 and/or one or more of the assistance engines 35, in embodiments. Some of the applications 40a, 40b may be utilized by other applications 40a, 40b, in embodiments. Additionally, or alternatively, the applications executing at the DCS compute clusters 26, the DCS operator user interfaces 32 and/or the assistance engines 35 may directly access the plant information model 18 and/or the generic framework 22, e.g., via the set of APIs 20.

In embodiments, the industrial process plant ecosystem 15 includes a plant cloud computing component 50, which may store and/or host at least some of the applications of the plant application library 45, as denoted by reference 40c. The applications 40c residing at and/or executing in the cloud may include one or more applications 40a and/or one or more applications 40b, for example. The plant cloud component 50 may be communicatively connected to any number of user computing devices 52 via one or more networks 55. The one or more networks 55 may include any number of public and/or private communication and/or data networks, and may include any number of wired and/or wireless communication and/or data networks. Similarly, although not illustrated in FIG. 1, the plant cloud component 50 may be communicatively connected to the plant application library 45 and/or to other components of the DCS 25 via one or more networks, such as the networks 55. For example, the DCS 25 may include one or more edge gateways via which the plant cloud component 50 is communicatively connected to the DCS 25 and the plant application library 45.

As such, at least some of the applications 40c which have been provided by the DCS 25 to reside at the plant cloud computing component 50 may be made available to the various user computing devices 52, such as handheld portable mobile devices 52a, laptops or other types of personal computers 52b, vehicle display systems 52c, and the like, e.g., via the one or more networks 55, so that operators and/or users may remotely monitor and perform functions with respect to controlling a process and/or operating the process plant 15 during run-time operations, and so that other users (such as those at Level 3 and above) may monitor and adjust respective functionalities that are based on the run-time operations of the plant 15, e.g., supply chain management, maintenance, parts and equipment ordering, etc. For example, some of the applications 40c may be downloaded from the plant cloud component 50 into the user computing devices 52, and/or some of the applications 40c hosted at the plant cloud component 50 may be accessed by various user computing devices 52 via client/server, web services, or other suitable access mechanisms. For instance, various DCS operator interfaces 32b and operator assist engines 35b may be implemented in the set of applications 40c at the plant cloud component 50 and made available to the user computing devices 52 so that the DCS operator interfaces 32b and operator assist engines 35b may be conveniently and securely provided at the user computing devices 52.

In embodiments, at least some of the applications 40c hosted in the plant cloud computing component 50 may be made available, via the network(s) 55, to one or more other systems 58 which are associated with the industrial process plant 15. At least some of the other systems 58 may be physically disposed at geographical locations that are physically distant from the physical location of the industrial process plant 15, and/or at least some of the other systems 58 may be physically disposed proximate to or even at the physical site of the industrial process plant 15. The other systems 58 may include layered or differently-leveled systems that are related to the physical industrial process plant 15 (e.g., systems that are "vertically integrated" with the DCS 25), such as enterprise business systems, systems associated with other plants, third-party vendor systems, and the like. The other systems 58 may include peer systems of the DCS 25 that are related to the physical industrial process plant 15 (e.g., systems that are "horizontally integrated" with the DCS 25), such as asset management, maintenance, diagnostic, simulation, remote monitoring, analytics, and/or other systems. It is noted that, in embodiments, at least some of the functionality of peer systems of the DCS 25 may be implemented within the plant ecosystem 12 via applications 40. For example, an analytics system or a simulation system may be implemented via respective applications 40. However, peer system functionality which is implemented within the plant ecosystem 12 via applications 40 does not preclude other peer system functionalities from additionally or alternatively being implemented within the ecosystem 12 by other computing systems 58, such as when the other computing systems 58 include legacy or embedded peer systems. Indeed, in embodiments, at least some of the peer systems of the DCS 25 may be implemented using a combination of applications 40 and other systems 58, if desired.

The following sections provide additional detail of the components of the industrial process plant ecosystem 12 and their components, functionalities, behaviors, and usages.

Data Center

As discussed above, the data center 10 of the industrial process plant 15 includes a plant information model 18, a set of APIs 20, and a generic framework 22, where the generic framework 22 includes a set of generic structures 22a and a set of generic functions 22b. Generally speaking, the platform supporting the data center 10 includes one or more processors, one or more tangible, computer-readable memories, and computer-executable instructions stored on the one or more tangible, computer-readable memories which, when executed by the one or more processors, cause the data center 10 to generate, maintain, and update the plant information model 18; provide and optionally modify the generic framework 22; and expose, provide, and optionally modify the set of APIs 20. In embodiments, the data center 10 may be configured a priori (e.g., out-of-the-box) with a pre-selected set of generic structures 22a and generic functions 22b, and/or with a pre-selected set of APIs 22 which may be utilized to create other functions and applications of the DCS 25, e.g., automatically by the DCS 25, and/or manually with operator or engineer intervention.

The plant information model 18 of the data center 10 is the basis on which components of the plant ecosystem 12 describe, refer to, and communicate information and data related to the industrial process plant 15. The plant information model 18 utilizes a common modeling language to represent or describe the industrial process plant and portions thereof from various physical and/or logical views or frames of reference, such as a physical plant description, a control strategy or control framework description, and a control network description of the industrial process plant 15.

Specifically, within the plant information model 18, the physical plant description of the physical industrial process plant 15 includes a description, representation, or model of the physical components of the plant 15 (such as instruments, devices, and other physical equipment of the plant 15), their physical locations within the plant 15, and their physical interconnections. For example, the physical plant description of the plant 15 includes descriptions of field devices installed within the plant 15 and their respective connections to networks, power sources, each other, etc. This view of the plant 15 within the plant information model 18 may be utilized for, for example, obtaining maintenance information, performing causality analysis based on physical interconnections, etc.

The control strategy or control framework description of the plant 15 within the plant information model 18 includes a description, representation, or model of the control components of the industrial process plant 15 from a logical view, such as sites, areas, units, equipment modules, control modules, control elements, etc., and their hierarchical relationships. The control components are defined within the control strategy or framework by respective, unique logical control identifiers (e.g., device tags, data tags, and/or other types of logical control identifiers). This view of the plant 15 may be utilized for providing a control framework, for example, by organizing control and scoping the names of the various control components to more easily understand their roles and relationships with respect to process control.

The control network description of the industrial process plant 15 within the plant information model 18 expands on the control components of the control strategy to add descriptions of the control components' interconnections and associations with other control-related components and devices of the plant 15 to thereby describe, represent, or model the process control and safety networks of the plant 15 and the other components and devices included therein. For example, the description of the control network may provide descriptions of configuration stations and/or user interfaces, operator stations and/or user interfaces, host computers, controllers (control and/or safety), I/O devices and/or other delivery mechanisms, smart devices, gateways, routers, etc., their respective logical control identifiers (if any), and their interconnections and associations with various control components to form the control and safety networks of the industrial process plant 15.

In embodiments, the plant information model 18 also maintains and updates respective states of the physical industrial process plant 15 and physical components thereof, and maintains/updates respective states of the logical control components and/or at least portions of control processes of the plant 15 (e.g., operating states). For example, the common modeling language may be utilized to maintain and update physical states and/or logical states of various physical and/or logical components and elements which are defined within the plant information model 18. Of course, other information descriptive of and/or related to physical and/or logical components of the physical process plant 15 may be stored and maintained within the plant information model 18.

The generic framework 22 of the data center 10 provides a set of generic structures 22a and a set of generic functions 22b. Typically, the generic structures 22a may provide templates of definitions or descriptions for different types of physical and logical components of the industrial process plant 15 and DCS 25, such as instruments, devices, networking and other types of equipment, blocks, parameters, I/O cards and/or delivery mechanisms, subsystems, and the like. Similarly, the generic functions 22b may provide templates of basic or commonly utilized functions within the industrial process plant 15, such as I/O data delivery and control functions. For example, generic functions 22b may include a set of basic control functions corresponding to advanced control, regulatory control, batch control, simple sequencing, interlocks, safety shutdown, adaptive control, event-based control, reinforced learning, and/or other control functions. Additionally or alternatively, the generic functions 22b may include a set of basic I/O data delivery functions such as an analog I/O function, a discrete I/O function, a motion I/O function, a near-infrared (NIR) I/O function, another type of I/O transport function, a sampling function, a signal conditioning function, and/or other I/O data delivery functions. Still additionally or alternatively, the generic functions 22b may include a set of basic support functions such as functions for alarms, history, trend, diagnostics, condition monitoring, descriptive analytics, predictive analytics, reinforced learning, buses/other communication pathways, I/O data transport, user interfaces, etc. Generally speaking, the generic functions 22b may be used out-of-the box to perform control, I/O data delivery, and/or support functions, and/or the generic functions 22b may be used as building blocks and combined in various ways to create more complex control, I/O data delivery, and/or support functions. As such, during configuration of any of the components of the industrial process plant ecosystem 12 (e.g., of the control cluster 28, the I/O cluster 30, other portions of the DCS 25, operator interfaces 32, assistance engines 35, applications 40, etc.), various generic structures 22a and/or generic functions 22b may be combined, scripted, and/or otherwise customized or configured to form various applications 40 and/or functions which are to execute on their respective industrial process plant ecosystem components. Generation and configuration of functions and/or applications 40 that execute within the plant ecosystem 12 are described in more detail elsewhere herein.

The data center 10 provides access to the plant information model 18 and to the generic framework 22 via a set of Application Programming Interfaces (APIs) 20 or other suitable access mechanisms, which may be exposed or otherwise provided to applications and processes external to the data center 10, and which utilize the common modeling language of the plant information model 18. In this manner, the data center 10 secures its contents from being compromised or attacked, as well as enables the fidelity of its contents to be more easily maintained. Various applications 40 that execute throughout the industrial process plant ecosystem 12 may be generated by obtaining, via the set of APIs 20, selected generic structures 22a and/or generic functions 22b which are configured based on information stored in the plant information model 18. Advantageously, the set of APIs 20 supports third-party extensions 48, so that third-party applications 40b may be generated based on selected information stored in the plant information model 18 and/or based on the generic framework 22 provided by the data center 10.

Distributed Industrial Process Control System (DCS)

The DCS 25 of the industrial process plant 15 includes the data center 10 and a set of physical compute modules 26, where each physical compute module includes respective processor(s), memories, and interfacing/networking mechanisms. As shown in FIG. 1, the compute modules of the DCS 25 include a cluster of control compute modules 28 (e.g., a "control cluster" 28, a cluster of I/O compute modules (e.g., an "I/O cluster" 30), and a set of other compute modules 31.

The control cluster 28 includes a subset of the compute modules 26 of the DCS 25, where the subset is particularly configured with and/or to execute or run control routines. The control routines may comprise one or more functions or applications that are stored on the one or more memories of the control cluster 28 and executed by the one or more processors of the control cluster 28 to perform industrial process control functionalities. For example, one or more applications 40 that are executable to perform process control functionalities may be downloaded from the plant application library 45 to reside and execute at the control cluster 28. Control routines may provide various industrial process control functionalities such as advanced control, regulatory control, batch control, simple sequencing, interlocks, safety shutdown, adaptive control, event-based control, reinforced learning, and/or the like. As discussed above, to generate the functions and applications 40 of the control routines, selected generic structures 22a and generic functions 22b may be configured and/or combined with respect to the control strategy and control network as defined by the plant information model 18 to generate functions and applications which provide first-order control functionalities, e.g., those control functionalities that operate directly on data generated by field devices and other control components to generate control signals to control the behavior of other control components. Additionally, some of the functions and applications 40 executed by the control cluster 28 may be configured based on generic structures 22a and functions 22b to perform second-order control functionalities which may impact the behavior of first-order control functionalities, e.g., monitoring functions, analytics functions, etc., and/or are otherwise related to first-order process control, e.g., alarming functions, trend functions, etc. For example, at the control cluster 28, a second-order predictive analytics function may operate in real-time on information generated by various devices and/or by first-order control functionalities during run-time operations of the plant 15 to monitor whether or not a process is predicted to be moving out of a tolerance range. Upon predicting that the process is moving out of the tolerance range, the second-order predictive analytics function may generate and send appropriate control signals to various other control routines executing at the cluster 28 to thereby automatically maintain the process within tolerance. In another example, at the control cluster 28, a second-order condition monitoring function may detect that the process has moved into a different state and, upon the detection, the second-order condition monitoring function may automatically generate appropriate control signals to various other control routines executing at the cluster 28 to move the process back to the previous state.

Similarly, the I/O cluster 30 includes a subset of the compute modules 26 that are specifically configured with I/O data delivery mechanisms, where the I/O data delivery mechanisms may comprise one or more applications, modules, algorithms, and/or functions that are stored on the one or more memories of the I/O cluster 30 and executed by the one or more processors of the I/O cluster 30 to perform I/O data delivery mechanisms. For example, one or more applications 40 that are executable to perform I/O data delivery mechanisms may be downloaded from the plant application library 45 to reside and execute at the I/O cluster 30. Unlike the control cluster 28, though, I/O cluster 30 or applications executed thereon is/are bound to various types of physical I/O and sampling ports or interfaces of the DCS 25 (e.g., one or more physical ports and/or physical interfaces, each of which is configured to support one or more types of I/O such as analog, discrete, motion, near-infrared (NIR), APL Ethernet, non-APL Ethernet, serial, motion, Railbus, HART, WirelessHART, Fieldbus, Profibus, etc., not separately depicted in FIG. 1), via which various networks and physical devices of the physical process plant 15 may be communicatively connected to the DCS 25. For ease of reading herein, and not for limitation purposes, such I/O and sampling ports and/or interfaces are referred to collectively and interchangeably herein as "I/O ports," "I/O interface ports," "interface ports," or "I/O physical interfaces." At any rate, to generate the I/O data delivery mechanisms and applications 40 which may execute at the I/O cluster 30, selected generic structures 22a and generic functions 22b related to I/O delivery may be configured and/or combined with respect to the descriptions of the plant 15 provided by the plant information model 18, e.g., the physical description, the control strategy description, and the control network description. Similarly, at least some of the bindings between the I/O data delivery mechanisms and the physical I/O ports may be automatically determined by the DCS 25 based on the information stored in the plant information model 18.

Generally speaking, to generate the control routines and/or I/O data delivery mechanisms executed by the control cluster 28 and the I/O cluster 30, selected generic structures 22a and generic functions 22b of the framework 22 may be configured, e.g., may be combined in desired manners and populated or scripted with particular component and/or element names, parameter values, etc., based on information provided by the plant information model 18. At least some of the applications 40 may be automatically configured, generated, and/or or created by the DCS 25 and assigned to respective compute modules 26, as is described in more detail elsewhere within this disclosure. Accordingly, during run-time operations of the industrial process plant 15, the control cluster 28 and the I/O cluster 30 execute their respective modules, routines, mechanisms, and/or functionalities, and I/O may be streamed between the control cluster 28 and the I/O cluster 30 modules to thereby control the process within the industrial plant 15.

In view of the above, scaling of the control cluster 28 and scaling of the logical functionality of the I/O cluster 30 (e.g., the expansion and/or contraction of the control cluster 28 and/or of the logical functionality provided by the I/O cluster 30) may be easily accomplished simply by adding or removing compute modules to meet the computing, functionality, bandwidth, response time, and/or other performance needs of the control cluster 28, the I/O cluster 30, and/or the DCS 25. For example, upon start-up of the DCS 25, at least a majority of the compute modules of the DCS 25 may be included in a pool of generic compute modules 31, and as compute modules are needed to execute various control routines and/or I/O data delivery mechanisms, various compute modules of the pool 31 may be assigned to operate as part of the control cluster 28 and/or the I/O cluster 30. Additional generic compute modules 31 may be added to the control cluster 28 and/or to the I/O cluster 30 to support a scaling up of the DCS 25, and various compute modules included in the control cluster 28 and/or the I/O cluster 30 may be deactivated and returned to the pool 31 to support a scaling down of the DCS 25, for example.

Further, and advantageously, during run-time operations the DCS 25 may dynamically level the load of compute modules of each cluster 28, 30 (and, in some implementations, among or across the compute modules of both of the clusters 28, 30 in an aggregate manner) via the (re)distribution of functionality, modules, and/or other control and/or I/O logical operations so that workloads are more evenly distributed among physical compute modules. For example, the DCS 25 may automatically allocate various control routines to execute on physical compute modules with more availability, e.g., when additional compute modules are added, when existing compute modules are removed, or at any time during run-time operations of the DCS 25. As such, it is possible for a single compute module to simultaneously operate as both a part of the control cluster 28 and as a part of the I/O cluster 30, in some situations.

Logical control functionality provided by the control cluster 28 of the DCS 25 may include, for example, first-order control functionalities such as advanced control, regulatory control, batch control, simple sequencing, interlocks, safety shutdown, adaptive control, event-based control, reinforced learning, and the like. As discussed above, such control functionalities may be implemented at the control cluster 28 by configuring and combining selected generic structures 22a and generic functions 22b with respect to the control strategy and control system as defined by information provided by the plant information model 18. Additionally, some control routines executed by the control cluster 28 may be configured to also include one or more other types of second-order control functionalities (e.g., monitoring functions, analytics functions, etc.) which may impact the control performed by the control routines.

Logical I/O functionality provided by the I/O cluster 30 of the DCS 25 may include I/O delivery to and from various types of physical I/O and sampling ports, for example, analog, discrete, motion, near-infrared (NIR), etc. In some embodiments, the I/O cluster 30 also provides signal conditioning. Similar to the logical control functionality, the logical I/O functionality may be implemented at the I/O cluster 30 by configuring selected generic structures 22a and generic functions 22b with respect to the I/O or data delivery requirements based on information provided by the plant information model 18 to generate I/O data delivery mechanisms that are executed by the I/O cluster 28. At least some of the I/O data delivery mechanisms may be bound to (e.g., assigned to or associated with) particular types of physical I/O ports of the DCS 25, for example.

Compute modules 31 of the DCS 25 which are not assigned to execute as part of the control cluster 28 or as part of the I/O cluster 30 may be idle, may be designated and configured as hot spares for other compute modules, or may be assigned to execute to perform other functionalities to support the DCS 25 during run-time operations of the industrial process plant 15. For example, various physical compute modules 26 may be configured to manage, provide, and/or host the plant application library 40, to provide or host operator user interfaces 32, to provide or host assistance engines 35, and/or other functionalities. At least some of the compute modules 26 of the DCS 25 may be configured a priori (e.g., out-of-the-box) to provide automatic discovery of I/O ports and devices that are communicatively connected to the DCS 25, and automatic generation of the plant information model 18 and optionally any additional functionalities and applications corresponding to the plant information model 18, as is described elsewhere within this disclosure. At least some of the compute modules 26 may be configured a priori (e.g., out-of-the-box) to be an administrator or manager of the compute modules 26, and as such may be configured to perform functionalities such as monitoring available resources and statuses of compute modules 26, (re-)assigning various functionalities to various compute modules, and the like.

Operator Interfaces

As discussed above, the DCS operator user interfaces 32 (also referred to interchangeably herein as Human Machine Interfaces 32 or HMI 32) enable operators or users to view and perform functions with respect to controlling a process and/or operating the process plant 15 during run-time operations, such as changing settings, modifying the operations of control modules within controllers and/or field devices, viewing the states and/or statuses of the process and its components, viewing alarms, respond to various run-time events, etc. Operator user interfaces 32 may also include intelligent interfaces that allow operators to search or query the DCS 25 for desired information, as well as filter, group, sort, and/or rearrange how information is presented visually and/or in an auditory manner by the operator user interface 32, for example. In embodiments, operator user interfaces 32 may provide the ability for operators to verbally query, instruct, and/or intelligently dialogue with the DCS 25 via the operator interface 32, e.g., in a hands-free manner, to perform desired functions related to controlling the process and/or operating the process plant 15. Some investigative functions such as diagnostics and/or analytics may be initiated and monitored via operator user interfaces 32, in embodiments.

As illustrated in FIG. 1, one or more operator user interfaces 32a may be executed at local computing devices (e.g., operator stations) which are located on site or proximate to the industrial process plant 15, e.g., in a back-end environment of the plant 15 or otherwise at a same level of security as the DCS 25, e.g., Level 2 or 3 of the Purdue Model. For example, some local operator user interfaces 32a may be downloaded from the library 45 to execute at the local computing devices or operator stations. Additionally or alternatively, some local operator user interfaces 32a may be hosted on-site by one or more designated compute modules 26, and local computing devices may access the hosted user interfaces 32a, e.g., as a website, a service, etc.

Still additionally or alternatively, one or more operator user interfaces 32b may be remotely provided via the plant cloud computing component 50 and one or more personal computing devices such as mobile devices 52a, laptops or tablets 52b, vehicle displays 52c, etc. For example, some remote operator user interfaces 32b may be downloaded from the plant cloud component 50 to execute at the remote computing devices 52. Additionally or alternatively, some remote operator user interfaces 32b may be hosted by the plant cloud component 50, and remote computing devices 52 may access the hosted remote user interfaces 32b, e.g., as a website, a service, etc. Different operator interfaces 32a, 32b may be implemented by configuring selected generic structures 22a and generic functions 22b (e.g., by utilizing the set of APIs 20) based on information provided by the plant information model 18 to generate operator user interface views and functionalities. In some scenarios, the DCS 25 automatically generates, creates, and/or configures one or more of the operator interfaces 32a, 32b based on information stored in the plant information model 18, as is described in detail elsewhere in this disclosure. Configured operator interfaces 32a, 32b are stored in the plant application library 40 for access by various components of the DCS ecosystem 12, such as the plant cloud component 50, the local DCS operator interfaces 32a, etc.

Assistance Engines

The assistance engines 35 may include operator assist engines 35a, 35b and control assist engines 35c, 35d. Generally speaking, an operator assist engine 35a, 35b may monitor operator actions at DCS operator user interfaces 32 as the operator is entering a sequence of queries and commands, and may predictively warn the operator (e.g., visually and/or in an auditory manner via the DCS operator user interfaces 32) when a set of actions that the operator is planning to undertake would result in the process drifting out of the boundaries of acceptable operations and/or would cause an alarm, fault, or other undesirable condition to occur. In some embodiments, the operator assist engines 35c, 35d may also provide additional information to aid the operator in determining and/or performing alternate or mitigating actions. For example, an operator assist engine 35a, 35b may warn the operator of a flare that is predicted to occur, and the operator assist engine 35a, 35b may provide the operator with significant factors contributing to the predicted flare and/or even specific mitigating actions for the operator to take to thereby head off the flare from occurring. In some embodiments, the operator assist engines 35c, 35d may initiate a dialogue with the operator (e.g., visually or in an auditory manner) to obtain additional information so as to better advise the operator on alternate or mitigating actions. In some situations, if the operator does not respond to the warning, the control assist engine 35c, 35d may automatically undertake at least some of the specific mitigating actions, e.g., to at least bring the process into a safe operating state. Control assist engines 35c, 35d (e.g., the availability of control assist engines 35c, 35d) may be activated or deactivated (e.g., individually or in groups). For some control assist engines 35c, 35d, trigger conditions for executing automatic control assist may be defined a priori (and, in some cases, the trigger conditions may be adjusted or modified). For instance, trigger conditions may be defined to initiate various operator assist functionalities 35 based on specific events, specific states, specific levels of risk, predicted impact, etc.

Automatic Generation

As indicated above, the DCS 25 automatically generates and populates at least some of the plant information model 18 and, in some embodiments, also automatically generates additional control, I/O, HMI, and/or other functionalities upon initialization, upon completion of a physical connection to equipment disposed in the industrial process plant 15, upon an addition of another I/O port at the DCS 25, upon an addition of another device disposed in the physical plant 15, and/or in other scenarios. For example, upon the DCS 25 initializing or booting up, the DCS 25 may automatically discover or sense the number and types of different physical I/O ports which have been included in the DCS 25. Based on the sensed I/O ports and their respective I/O types, the DCS 25 may automatically generate respective representations of the sensed ports and their respective I/O types, and store the generated representations in the description of the physical plant 15 of the plant information model 18 of the data center 10 (e.g., in the description of the physical plant 15 and/or in the description of the control network), for example, by utilizing the common modeling language. The DCS 25 may utilize one or more out-of-the-box generic structures 22a corresponding to I/O ports and/or I/O types to automatically generate representations of the sensed I/O ports and their respective I/O types. Further based on the sensed I/O types, the DCS 25 may automatically generate one or more respective I/O data delivery mechanisms to support I/O data delivery to/from the sensed I/O ports. In some embodiments, at least some of the I/O data delivery mechanisms that are needed to support data delivery for the sensed I/O ports may be already included out-of-the-box in the DCS 25, e.g., as I/O data delivery functions included in the generic framework 22. In some embodiments, the DCS 25 may automatically generate additional I/O data delivery mechanisms to support data delivery for the sensed I/O ports by configuring and/or combining various the generic functions 22b which were included out-of-the-box. The automatically generated additional I/O data delivery mechanisms may be stored as applications 40, in embodiments. Subsequent to the DCS 25 automatically generating one or more IO data delivery mechanisms, in an embodiment, the DCS 25 may instantiate the I/O data delivery mechanisms into corresponding I/O containers, and the I/O containers may be respectively allocated to one or more compute modules of the I/O cluster 30 for activation (e.g., "spinning up") and execution or running during run-time operations of the plant 15.

Additionally, the DCS 25 may automatically sense any devices, instruments, and/or equipment of the plant 15 that are communicatively connected to the I/O ports, and may automatically generate and store respective representations thereof in the plant information model 18. In an example configuration, the devices, instruments, and/or equipment of the industrial process plant 15 may be physically connected to the I/O ports of the I/O cluster 30 via one or more high-speed Ethernet connections 60 (e.g., 100 M Gigabit Ethernet, etc.), which may include Advanced Physical Layer (APL) transport technology that supports one or more protocols to thereby enable the intrinsically safe connection of field devices, other devices, other various instruments, and/or other equipment located in remote and hazardous locations, e.g., the field environment of the process plant 15. As such, the DCS 25 may utilize discovery mechanisms provided by the one or more protocols supported by the APL of the Ethernet connection 60 to automatically sense any devices that are communicatively connected to the I/O ports (e.g., field devices, and optionally other devices, instruments, and/or equipment disposed in the field environment of the plant 15). The DCS 25 may generate and store respective representations of the sensed devices and/or equipment in the plant information model 18 (e.g., in the description of the physical plant 15 and/or in the description of the control network) by utilizing the common modeling language. For example, the DCS 25 may automatically generate representations of sensed devices, instruments, and/or equipment, by utilizing one or more out-of-the-box generic structures 22a corresponding to the devices, instruments, and/or equipment.

Based on a sensed I/O port and a connected device of the plant 15, the DCS 25 may automatically generate a control application, control routine, control module, control or function block, and/or control algorithm that is specific to the type of the connected device. For example, different control routines, applications, modules, blocks, and/or algorithms may be generated for different field devices (such as actuators, sensors, measurement devices, etc.) by utilizing one or more out-of-the-box generic functions 22b related to process control functions. Generally, and as previously discussed, a control routine or application may execute one or more different control modules, where each control module may utilize different control algorithms or logic to receive inputs from the run-time industrial process plant, make process control decisions based on the received inputs, generate process control signals to control other devices based on the decisions, and coordinate with control modules or blocks being performed or executed in other process control devices (such as field devices) to thereby control the run-time industrial process. For ease of reading herein, though, and not for limitation purposes, the term "control routine" is utilized herein to generally refer to control routines and/or applications, control modules, control or function blocks, and/or control modules.

In some scenarios, the automatically generated, different control routines may initially be configured with placeholders for the specific logical control identifiers (e.g., device tags, data tags, and/or other types of logical control identifiers) of the devices and/or of the equipment associated therewith. At some point during configuration of the DCS 25, a user may assign the specific logical control identifiers to respective devices and/or equipment (e.g., via a configuration user interface of the DCS 25, not shown in FIG. 1), and the assigned control identifiers may replace or populate respective placeholders within the different control routines. In other scenarios, some of the sensed devices and/or sensed equipment themselves may have a priori knowledge of the logical control identifier or identifiers by which they are to be respectively identified to the control networks of the plant 15, and may automatically provide their respective logical control identifier or identifiers to the plant information model 18 during the discovery process. In these situations, the plant information model 18 may automatically include the provided, respective control identifiers in the automatically generated, different control routines corresponding to these devices/equipment. In still other scenarios, a mapping server (such as DNS server or similar) may provide respective logical control identifiers of various devices/equipment to the plant information model 18 during the discovery process, and the plant information model 18 may automatically include the provided, respective control identifiers in the automatically generated, different control routines corresponding to the various devices/equipment. At any rate, the DCS 25 may store the generated control routines as applications 40, and the DCS 25 may store indications of the logical control identifiers that have been assigned to respective devices and/or equipment (e.g., by a user during configuration, or a priori as provided by the devices, equipment, and/or mapping service) in the plant information model 18 (e.g., in the description of the control strategy and/or in the description of the control network).

Subsequent to the DCS 25 automatically generating (and populating with logical control identifiers, if necessary) one or more control routines, the DCS 25 may instantiate the populated one or more control routines into corresponding control containers. The control containers may be respectively allocated to one or more compute modules of the control cluster 28 for activation (e.g., "spinning up") and execution or running during run-time operations of the plant 15.

Additionally, in embodiments, Human Machine Interface (HMI) graphics and/or display views (e.g., which are presented on one or more DCS operator interfaces 32), may also be automatically generated as the plant information model 18 is populated with information. The DCS 25 may automatically generate HMI graphics and/or views based on the plant information model 18 by utilizing one or more out-of-the-box generic structures 22a and/or functions 22b of the data center 10. For example, the DCS 25 may automatically generate HMI graphics and/or display views that are specific for various types of sensed devices and/or sensed equipment, e.g., as the devices/equipment are sensed and added to the representation of the physical plant 15 of the plant information model 18. For example, the DCS 25 may automatically generate a temperature display view when a temperature sensor is discovered. Additionally or alternatively, the DCS 25 may automatically generate HMI graphics and/or views that are specific to various types of control routines, e.g., as the control routines are automatically generated and added to the control strategy stored in the plant information model 18, and/or the DCS 25 may automatically generate HMI graphics and/or views that are specific to various functionalities related to control (e.g., alarms, alerts, safety algorithm/modules, etc.) as various devices, equipment, control routines, etc. are discovered and/or generated. Further, in some implementations, more complex HMI graphics and/or views may be automatically generated, e.g., based on multiple control routines, based on a control routine and additional generic functions 22b, based on an analytics performed on data generated by a control component, etc. Generally speaking, HMI graphics and/or views may be automatically generated based on any information and/or combination of information that has been stored into the plant information model 18 of the DCS 25. For some automatically generated HMI graphics and/or views, placeholders for logical identifiers of various devices, equipment, etc. may be initially utilized, and may be later populated with particular logical identifiers (e.g., in a manner similar to that discussed above for control routines). For some automatically generated HMI graphics and/or views, an entirety of a set of HMI graphics and/or views may be automatically generated without any user input, e.g., solely based on information included in the plant information model 18, which may have already been populated with the logical identifiers associated with the generated HMI graphics and/or views. At any rate, upon the DCS 25 automatically generating (and populating, if necessary) a set of HMI graphics and/or views, the DCS 25 may instantiate the populated set of HMI graphics and/or views, for example, as applications 40; as modules executing at the DCS operator user interfaces 32; and/or as HMI containers, which may be respectively allocated to one or more compute modules for execution/running (e.g., at the control cluster 28, at the operator user interfaces 32, at other compute modules 31, at the plant cloud computing component 50, and/or any other suitable computing location within the ecosystem 12.)

Although automatic generation of the plant information model 18 and related control and HMI functionalities/applications has been discussed thus far with respect to the initialization or booting up of the DCS 25, one of ordinary skill in the art will appreciate that similar techniques may be applied after the DCS 25 has been initialized and a change in a physical configuration of the DCS 25 and/or the plant 15 occurs, such as when additional physical I/O ports are added to the DCS 25, an additional physical device and/or equipment is added somewhere within the industrial process plant 15, and the like.

Further, although automatic generation of the plant information model 18 and related control and HMI functionalities/applications has been discussed thus far with respect to connecting the physical plant 15 to the physical I/O ports of the DCS 25 via one or more Ethernet transport mediums having APL, one of ordinary skill in the art will appreciate that any or all of the techniques may easily be applied to other types of transport mediums which physically interconnect at least a part of the DCS 25 and the physical industrial process plant 15, with or without utilizing I/O ports, and with or without utilizing APL. For example, Ethernet without APL or a high-capacity packet network technology other than Ethernet may be utilized to physically connect at least portions of the industrial process plant 15 to the DCS 25, e.g., to one or more I/O ports, or to other types of interface ports of the DCS 25, such as high-speed Ethernet ports. Indeed, in embodiments, multiple types of interconnection technologies may be utilized to interconnect the physical industrial process plant 15 and the DCS 25. For example, a DCS 25 may connect to the physical process plant 15 via I/O ports and Ethernet with APL, via I/O ports and non-Ethernet transport mediums, and via other types of interface ports and non-Ethernet transport mechanisms.

Still further, with respect to security, chain-of-trust may be implemented within the components of the industrial process plant ecosystem 12 from the initial booting of the compute modules supporting the plant information model 18 through applications, devices, and/or nodes joining the ecosystem 12, to the eventual execution of the applications themselves. Additionally or alternatively, the data center 10 may utilize one or more security applications or mechanisms to secure the contents of the plant information model and/or access to the plant information model. For example, the one or more security applications or mechanisms may be provided a priori or out-of-the-box with the data center 10, and as such may have been stored onto the memories of the data center 10 prior to an initialization of the data center 10.

Functions, Applications, and Live Migration

As previously discussed, applications and functions 40a, 40b may be generated by utilizing one or more generic structures 22a and/or generic functions 22b, and some applications 40b may be generated further based on one or more third party extensions 48. Applications/functions 40a, 40b may be stored in the plant application library 45. Some applications 40 may be automatically generated by the DCS 25, e.g., by utilizing the generic framework 25 and the plant information model 18, and some applications 40 may be at least in part manually generated, e.g., via an operator or user interface 32. Examples of possible applications may include an operator application, a configuration application, an I/O data delivery application, a search application, another type of user interface application, a process control application, a diagnostic application, an operator-facing assist application, a control system-facing assist application, a component validation application, a condition monitoring application, a remote monitoring application, a maintenance application, a descriptive analytics application, a predictive analytics application, a machine-learning application, or a decision support application, to name a few. Additionally or alternatively, possible applications may include an OT (Operations Technology) layer application provided by the industrial distributed process control system, an IT (Information Technology) layer application provided by an enterprise of the process control system, another type of application provided by the enterprise, a user interface application, a cloud computing application, a decision support application, another type of analytics application, an application executing on a mobile device, an application executing on another system of the enterprise, or an application provided by and executing on a third-party system.

Instances of the applications 40a, 40b may be retrieved from the library 45 to execute on various components of the plant ecosystem 12, for example, at the control cluster 28, at the I/O cluster 30, at the DCS operator user interfaces 32a, as part of the assistance engines 35, and in the plant cloud computing component 50 and optionally at associated remote user devices 52. Similarly, although not shown, generic functions 22b may also be retrieved and executed on the various components of the plant ecosystem 12.

Generally speaking, applications and functions 40 provided within the plant ecosystem 12 may be packaged in a platform-neutral manner so that they are executable on multiple different types operating systems, e.g., Windows, Linux, etc. Referring to the control cluster 28 as an illustrative but non-limiting example of an execution environment within the ecosystem 12, applications 40 and/or functions 22b may be packaged as respective containers (such as containers provided by DOCKER® computer software) or respective actors (such as actors provided by Akka.NET) that are assigned to execute at the control cluster 28. For example, the control cluster 28 may execute or run one or more control containers or actors, one or more alarm containers or actors, one or more safety containers or actors, etc. For ease of discussion, the entity into which application and/or functions may be packaged are generally referred to herein as "containers," although it is understood that any suitable packing technique may be utilized to package applications and functions in a platform-neutral manner, including actors and/or other techniques.

Further, as the control cluster 28 comprises multiple compute modules 26, each container assigned to the control cluster 28 may be further assigned to execute or run on one or more specific compute modules of the control cluster 28. As such, containers may be assigned (and in some cases, dynamically assigned or live migrated during run-time operations of the plant 15) to compute modules which have available computing capabilities and/or resources. Indeed, control-related containers need not be assigned to execute or run only on computing modules of the control cluster 28, but may be assigned to execute or run on any computing module of any cluster or processing environment provided by one or more components of the plant ecosystem 12 which has available computing capabilities and/or resources, such as the I/O cluster 30, a cluster which supports DCS operator user interfaces 32a, spare clusters 31, and the like. Typically, but not necessarily, at least due to security and performance reasons. applications 40 and/or functions 22b may be assigned to execute on local compute modules, e.g., on compute modules of ecosystem components which are not in disposed in the cloud component 50 and/or which are not otherwise remotely disposed from the process plant 15 (e.g., at Purdue Model security level 2 or 3). In an embodiment, assignment and migration of applications 40 and/or functions 22b to various compute modules may be implemented by utilizing Software Defined Networking (SDN), Network Function Virtualization (NFV), and/or other technologies that allow a full stack of switches, address allocation, and routers to be fully defined in software.

Live migration or dynamic assignment of applications and/or functions (e.g., of the containers into which the applications and/or functions are respectively packaged or implemented) to respective compute modules may be triggered or otherwise performed automatically. For example, during run-time of the industrial process plant 15, the DCS 25 may monitor the computing resources that are available and/or utilized at each compute module, and may dynamically assign/re-assign applications and/or functions to other compute modules as conditions at various compute modules change or as conditions are predicted to change. For example, the DCS 25 may reactively and/or preventatively perform dynamic leveling of loads of the compute modules which are in use at a particular component of the ecosystem 12, such as at the control cluster 28 or at the I/O cluster 30, and/or across or among multiple components of the ecosystem 12, such as leveling or balancing the loads of all compute modules which are in use across both the control cluster 28 and the I/O cluster 30. In some situations, live migration or dynamic assignment of applications and/or functions (e.g., of the containers into which the applications and/or functions are respectively packaged or implemented) to respective compute modules may be triggered by manual operator action, such as when specific compute modules need to be taken off-line for routine maintenance and/or upgrades. For example, an operator may select a controller to be taken off-line for routine maintenance and/or upgrades, and based on the operator selection, any applications and/or functions executing on the selected controller may be automatically live-migrated to other compute modules (of the control cluster 28, of the other components of the DCS 25, or of the other components of the ecosystem 12) for seamless continuation of execution, e.g., a "bumpless" transfer. In conjunction with the live-migration, automatic load leveling of the compute modules which remain in use may be automatically performed, in embodiments.

Indeed, the DCS 25 may provide bumpless transfers of functionality (and in particular, bumpless transfer of control and I/O functionalities) so that the DCS 25 may maintain high availability during run-time of the industrial process plant 15. For example, the control cluster 28 may include back-up controllers (which may be implemented via respective applications and/or functions) in a 1-to-1 arrangement or in a 1-to-many arrangement. When a switchover of control functionality from an active controller to a back-up controller is necessary, the back-up controller may be activated (e.g., one or more containers into which the back-up controller functionality is packaged may be "spun up") and synchronized with the active controller to provide live migration or bumpless transfer to the back-up controller. Alternatively, in some situations, the back-up controller may execute in the background to track the run-time behavior of a respective active controller so that no or minimal synchronization is needed when real-time control functionality is shifted from being provided by the active controller to being provided by the back-up controller.

Pluggable DCS Hardware Modules

In an embodiment, the DCS 25 may be implemented using one or more universal (e.g., interchangeable), scalable, plug-and-play DCS hardware modules. A single universal, scalable, plug-and-play DCS hardware module may be utilized as a stand-alone unit to serve as a DCS 25, or may be combined with other universal, scalable, plug-and-play DCS hardware modules to scale up to a desired size of the DCS 25 (e.g., to a desired capacity, performance level, set of functionalities, etc.). Such a universal, scalable, plug-and-play DCS hardware module is referred to interchangeably herein as a "pluggable DCS hardware module," a "pluggable DCS module" or a "pluggable hardware module."

Figure 2:
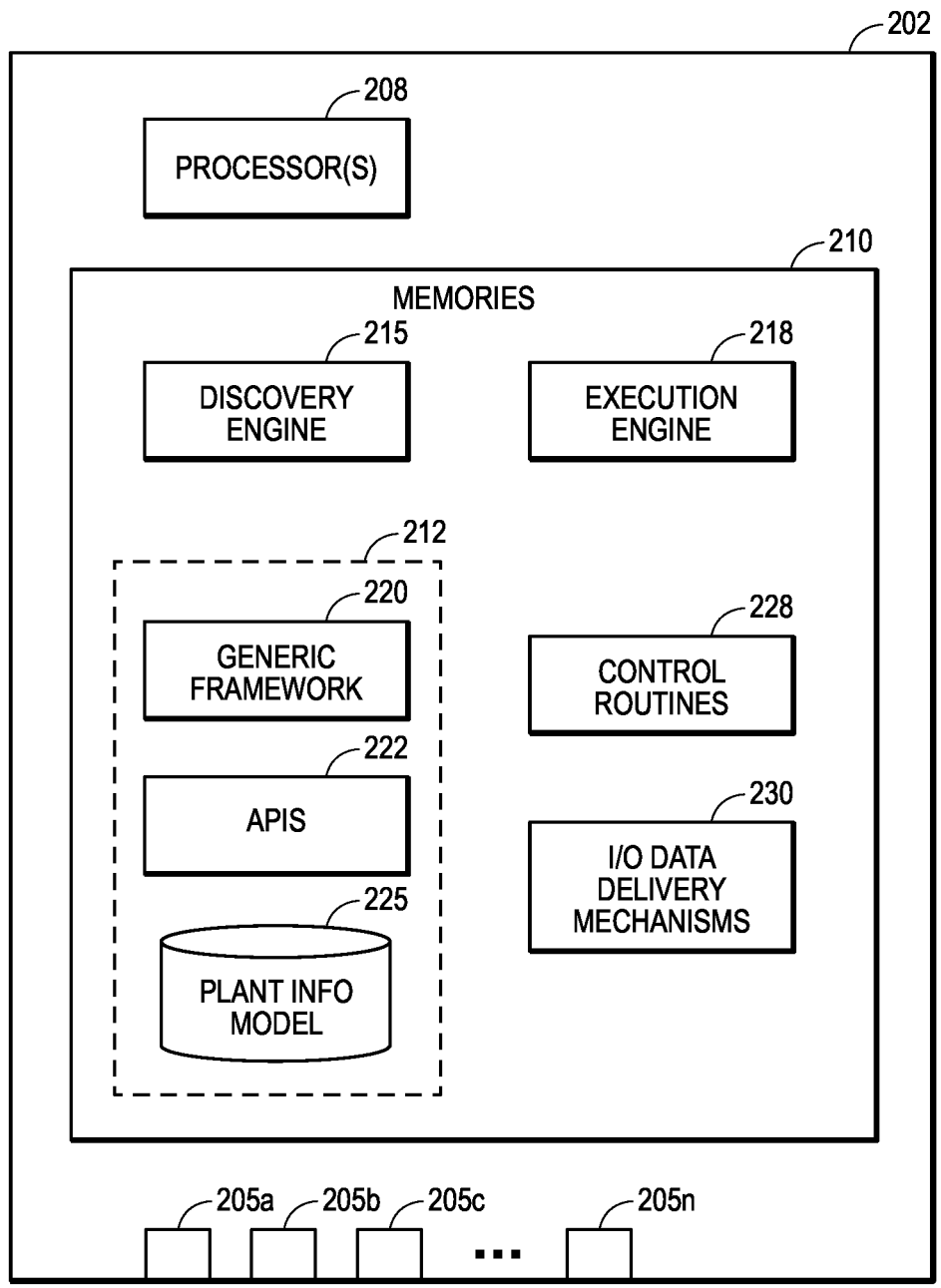
FIG. 2 depicts a block diagram of an example pluggable, interchangeable hardware module, which may be included in the industrial distributed process control system of FIG. 1.

FIG. 2 illustrates a block diagram of an example pluggable DCS hardware module 200. The pluggable DCS hardware module 200 may be included in the DCS 25 which is servicing or supporting the industrial process plant 15 of FIG. 1, or may be included in other DCSs servicing or supporting other industrial process plants, for example. As shown in FIG. 2, the pluggable DCS hardware module 200 is a hardware module comprising a physical housing 202 surrounding its internal components 205-230 which provide a standardized set of DCS interfaces, functionalities, and features. In some embodiments of the pluggable DCS hardware module 200, though, the housing 202 may be omitted.

The example pluggable DCS hardware module 200 includes a standard set of interface ports 205a, 205b, 205n, at least some of which are configured to send and receive a standard set of I/O data types to/from the pluggable DCS hardware module 200. For example, the set of interfaces ports 205a-205n may include an Ethernet APL port and/or other types of ports which support the delivery of different types of I/O data to/from the field environment of an industrial process plant, such as analog I/O, discrete I/O, motion, NIR, serial, non-APL Ethernet, Wi-Fi, serial, Railbus, HART, WirelessHART, Fieldbus, Profibus, etc. The set of interface ports 205a-205n may support various transport mediums which are utilized within process control networks, such as two-wire and/or four-wire busses, optical links, wireless communications, high-speed Ethernet ports supporting APL, Ethernet that does not support APL, and the like. Generally speaking, the set of interface ports 205 are configured to support one or more industrial control protocols such as 4-20 mA, Fieldbus, Profibus, HART, WirelessHART, HART-IP, OPC UA, etc. Further, the set of interface ports 205 of the pluggable DCS hardware module 200 may include one or more networking ports which are configured to support other types of general data and communications delivery protocols, such as IP or other packet based communication protocols, Wi-Fi, Bluetooth, etc., thereby allowing the pluggable DCS hardware module 200 to communicatively connect to other pluggable DCS modules 200, the industrial process plant 15 (or components thereof), and/or other systems and devices.

The example pluggable DCS hardware module 200 also includes one or more processors 208 and one or more tangible, non-transitory memories 210. In an embodiment, the pluggable DCS hardware module 200 comprises one or more compute modules which include the one or more processors 208 and the one or more memories 210. A data center 212 and respective computer-executable instructions for a discovery engine 215 and an execution engine 218 are stored on the one or more memories 210 of the pluggable DCS hardware module 200 a priori. That is, the data center 212, the discovery engine 215, and the execution engine 218 may be loaded or stored on onto the one or more tangible memories 210 of the pluggable DCS hardware module 200 prior to the pluggable DCS hardware module 200 being initially booted up on-site at the industrial process plant 15. As shown in FIG. 2, the data center 212 includes a generic framework 220, a set of APIs 222, and a storage area for a plant information model 225 of the industrial process plant supported by the pluggable DCS hardware module 200. The data center 212 may be similar to the data center 10 of FIG. 1, for example. As such, the generic framework 220 may include a standard set of generic structures and a standard set of generic functions, where the standard set of generic functions may include control, I/O, HMI, and analytic functions. The set of APIs 222 may utilize a modeling language that is common to the generic framework 220 and to the plant information model 225, and the set of APIs 222 may be exposed for usage by other applications.

Upon initialization of the pluggable DCS hardware module 200, the one or more processors 208 may execute the computer-executable instructions of which the discovery engine 215 is comprised to cause the DCS module 200 to automatically generate the plant information model 225 describing the industrial process plant which is supported by the pluggable DCS hardware module 200. For example, the discovery engine 215 may sense the number and types of I/O ports 205 which have been included in the pluggable DCS hardware module 200, and may utilize the APIs 222 and the generic framework 220 to generate descriptions of the sensed I/O types and I/O ports, e.g., in a manner similar to that described above. The discovery engine 215 may populate the plant information model 225 with the generated descriptions of the sensed I/O types and I/O ports, e.g., by utilizing the common modeling language and optionally by utilizing some of the generic structures provided by the generic framework 220.

Additionally, the discovery engine 215 may detect or discover, via the connected I/O ports 205 or upon connection of one or more of the I/O ports 205 to the industrial process plant, a set of physical components or devices of the industrial process plant to which the pluggable DCS hardware module 200 is communicatively connected via the I/O ports 205. For example, for a sensed APL port, the discovery engine 215 may utilize a discovery mechanism of a packet protocol to discover one or more devices which are communicatively connected to the pluggable DCS hardware module 200 via the APL port. The discovered or detected devices typically are physically disposed within the industrial process plant, and may include various field devices which will be utilized by the plant to perform physical functions to control the industrial process, for example, actuators, sensors, measurement devices, pumps, heaters, etc., and/or other types of process control devices. In some configurations, the discovered or detected devices may include physical industrial controllers, such as process controllers or safety controllers. In some configurations, the discovered or detected devices may include I/O devices, such as I/O cards and/or I/O marshalling cabinets. In some arrangements, the discovered or detected devices may additionally include networking devices such as routers, adaptors, and the like. Indeed, in some embodiments, the discovered or detected devices may include devices of other systems associated with the industrial process plant, such as asset management systems, analytics systems, etc. Such other systems may typically be at a similar level of security as the pluggable DCS hardware module 200 (e.g., Purdue Model level 3 or 4), but this is not required.

At any rate, the discovery engine 215 may utilize the APIs 222 and the generic framework 220 to generate descriptions of the detected or discovered physical devices within the physical plant description of the plant information model 225 and, if appropriate, within the control strategy/control framework description and/or control network description of the plant information model 225, e.g., in a manner similar to that described elsewhere within this disclosure. Thus, the discovery engine 215 populates the plant information model 225 with physical descriptions and optionally logical descriptions of the detected or discovered physical devices. For example, for discovered field devices, the discovery engine 215 populates the plant information model 225 with respective physical descriptions of the field devices, respective logical descriptions of the field devices as control components of the plant, and descriptions of the field devices in relationship with other control network components of the plant.

The discovery engine 215 may automatically generate respective types of control routines that are based on the types of discovered devices, e.g., in a manner similar to that described elsewhere within this disclosure. For example, different control routines may be generated for different field devices (such as actuators, sensors, measurement devices, etc.) by utilizing one or more out-of-the-box generic functions (e.g., of the generic framework 220) which are related to process control functions. In some scenarios, the discovery engine 215 may also automatically generate respective HMI/display views corresponding to the discovered devices, e.g., in a manner such as that described above. Generated control routines and generated HMI/display views may be stored in the memories 210 of the pluggable DCS hardware module 200. During run-time operations of the industrial process plant, the processors 208 of the pluggable DCS hardware module 200 may execute the computer-executable instructions of which the execution engine 218 is comprised to execute the control routines, HMI/display views, various generic functions, and/or other applications and/or functionalities stored on the memories 210 of the pluggable DCS hardware module 200 to thereby control the industrial process of the plant and to provide other functionalities related to controlling and operating the industrial process plant.

Of course, in addition to performing discovery actions upon initialization of the pluggable DCS hardware module 200, the discovery engine 215 may be triggered to perform discovery actions at other times during run-time of the industrial process plant. For example, during run-time, if the discovery engine 215 senses that an additional interface port has been added to the pluggable DCS hardware module 200, the discovery engine 215 may initiate discovery logic to thereby add a description of the additional interface port and any devices communicatively connected to the pluggable DCS hardware module 200 via the additional interface port. Similarly, during run-time, if the discovery engine 215 discovers or detects that an additional device has been added (e.g., via an already-sensed interface port), the discovery engine 215 may initiate discovery logic to thereby add a description of the description of the additional device and any control strategies related to the type of the additional device, e.g., in a manner similar to that described above.

Thus, in some implementations, a single pluggable DCS hardware module 200 may, out-of-the-box and upon initialization, self-configure to serve as a DCS (e.g., the DCS 25) for a smaller-sized industrial process plant. Additional I/O ports may be added to the single, pluggable DCS hardware module 200 to provide additional numbers and/or types of I/O interfaces up to a limit, if and when desired. Additionally or alternatively, additional compute modules may be added to the out-of-the-box, single pluggable DCS hardware module 200, e.g., to provide additional computing resources up to a limit, if and when desired. Generally speaking, the maximum size of a single pluggable DCS hardware module 200 is limited by hardware, e.g., physical dimensions of the housing 202, number of possible physical ports 205, number of possible connections for additional compute modules, etc.

Advantageously, in other situations, multiple pluggable DCS modules 200 may be interconnected to collectively serve as a DCS (e.g., the DCS 25) for a larger-sized industrial process plant. In these larger configurations, each pluggable DCS hardware module 200, via its respective discovery engine 215, may discover other pluggable DCS modules 200 to which it is communicatively connected and the respective devices disposed in the industrial process plant that are communicatively connected to each of the pluggable DCS modules 200. For example, a first pluggable DCS hardware module 200 may discover a second pluggable DCS hardware module 200 upon the initialization. Alternatively, after the first pluggable DCS hardware module 200 has been initialized and configured, the first pluggable DCS hardware module 200 may discover the second pluggable DCS hardware module 200 upon the establishment of the communicative connection between the first and the second pluggable DCS modules. In an embodiment, the multiple, pluggable DCS modules 200 may operate, in a sense, as a set of individual switches that are networked with each other, each of which utilizes its own computing and hardware resources to manage the set of devices of the industrial process plant that are communicatively connected via its I/O ports. In another embodiment, multiple, pluggable DCS modules 200 may operate collectively as a single, logical DCS 25, such as the DCS 25 of FIG. 1, and may share computing and hardware resources to collectively manage all devices of the industrial process plant which are communicatively connected to the logical DCS 25 via various I/O ports of various modules 200. Of course, hybrid implementations which include both individual module management and collective module management are also possible.

As discussed above, during run-time of the industrial process plant to which the pluggable DCS hardware module 200 is communicatively connected, the one or more processors 208 of the hardware module 200 may execute computer-executable instructions of which an execution engine 218 is comprised to cause the DCS hardware module 200 to control at least a portion of an industrial process of the industrial process plant. In particular, the pluggable DCS hardware module 200 may include one or more control routines 228 and one or more I/O data delivery mechanisms stored on its one or more memories 210, each of which may be executable by the one or more processors 208, e.g., via the execution engine 218. Of course, other run-time routines and algorithms (not shown) may additionally or alternatively executed by the one or more processors 208 via the execution engine 218, such as generic functions of the generic framework 220, various support functions, routines, algorithms, and/or applications, such as HMI/display views, diagnostics, analytics, and the like.

At any rate, to illustrate using an example scenario, the pluggable DCS hardware module 200 may be communicatively connected, e.g., via a particular interface port 205a, to a field device disposed in the field environment of the process plant. Via the discovery engine 215, the plant information model 225 may sense, discover, generate, and store, using the modeling language, a description of a control loop in which the field device, the interface port 205a, and a particular control routine 228 are included. The particular control routine 228 may have been automatically generated based on one or more generic control functions included in the generic framework 220, in an embodiment, such as in a manner similar to that described above. Further, via the discovery engine 215 as previously discussed, the interface port 205a may be bound to a particular I/O data delivery mechanism 230. Accordingly, during run-time of the industrial process plant, the execution engine 218 may cause the particular control routine 228 and the particular I/O data delivery mechanism 230 to be executed at the pluggable DCS hardware module 200 to deliver process data between the control routine 228 and the field device, to thereby execute the control loop described in the plant information model 225, and to thereby control the industrial process. In an embodiment, the control routines 228 may be executed at or run at a cluster of control compute modules of the pluggable DCS hardware module 200, such as the control cluster 28 of FIG. 1, and/or the I/O data delivery mechanisms may be executed or run at a cluster of I/O compute modules of the pluggable DCS hardware module 200, such as the I/O cluster 30 of FIG. 1, for example.

Figure 3:
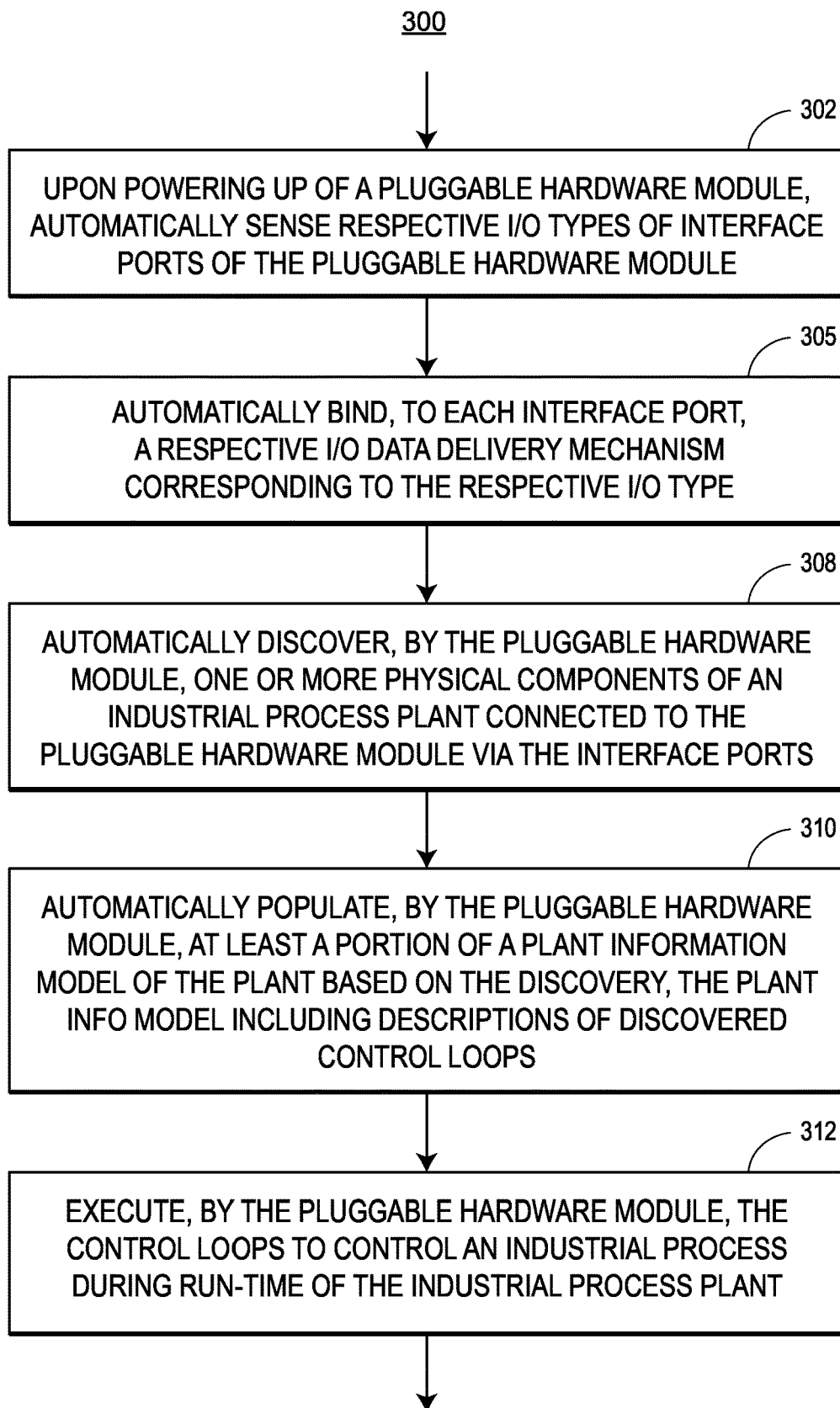
FIG. 3 depicts a flow diagram of an example method of initializing an industrial distributed process control system of an industrial process plant, such as the industrial distributed control system depicted in FIG. 1.

FIG. 3 depicts a block diagram of an example method 300 of automatically initializing an industrial distributed process control system (DCS) of a physical industrial process plant, such as the physical process plant 15 of FIG. 1. In embodiments, at least portions of the method 300 may be performed by the DCS 25 of FIG. 1, and/or at least portions of the method 300 may be performed by one or more pluggable, interchangeable DCS hardware modules 200 of FIG. 2. In embodiments, the method 300 may include additional or alternate blocks other than those discussed within this disclosure.

The industrial distributed process control system initialized by the example method 300 includes a set of one or more pluggable, interchangeable DCS hardware modules, such as one or more of the DCS hardware modules 200. Generally speaking, a respective instance of the method 300 may be performed by each DCS hardware module of the set.

At a block 302, the method 300 includes, at a pluggable DCS hardware module of the set of pluggable DCS hardware modules included in the DCS, automatically detecting or sensing a respective I/O type of each interface port of a plurality of interface ports that are included in the pluggable DCS hardware module. The respective I/O types of the interface ports may be detected or sensed 302 upon a powering up or re-booting of the pluggable DCS module, and/or when an additional interface port is added to the pluggable DCS hardware module. As utilized herein, "I/O types" of interface ports may refer to various types of I/O data that are delivered via the interface ports, various types of transport mechanisms and/or mediums supported by the interface ports, various types of data protocols that are utilized to deliver I/O data via the interface ports, and the like. As such, example I/O types of interface ports may include analog I/O, discrete I/O, serial, motion, near-infrared, Railbus, Wi-Fi, Ethernet without Advanced Physical Layer, Ethernet with Advanced Physical Layer, HART, WirelessHART, Fieldbus, and Profibus, to name a few. Of course, other I/O types of interface ports are possible.

At a block 305, the method 300 includes binding, by the each pluggable DCS hardware module to each interface port, a respective I/O data delivery mechanism corresponding to the respective I/O type of each interface port. Generally speaking, during run-time operations of the plant, the respective I/O data delivery mechanism may transform the I/O data received via the interface port (if necessary) and deliver the received I/O data to an application, such as a control routine executing at the pluggable DCS hardware module. Similarly during run-time operations of the plant, the respective I/O data delivery mechanism may transform data received from the control routine and deliver, via the each interface port, the transformed data to devices disposed in the industrial process plant.

At a block 308, the method 300 includes automatically discovering, by the each pluggable DCS hardware module, one or more physical components of the industrial process plant to which the each pluggable DCS hardware module is communicatively connected via the plurality of interface ports. The one or more physical components include a field device that is communicatively connected to the each pluggable DCS hardware module via a respective interface port, and the field device is configured to perform a physical function to control an industrial process during run-time operations of the industrial process plant. In some configurations, the one or more physical components include a physical process controller and/or a physical safety controller. In some embodiments, the one or more physical components include a physical I/O device which is disposed between the respective interface port and the field device, to thereby enabling the field device and the control routine to communicate, during run-time, process data to control the industrial process.

In an example scenario with regard to automatic discovery 308, the method 300 may further include detecting, via at least one of the plurality of interface ports, that a particular physical component has been newly connected (e.g., communicatively connected) to the pluggable DCS hardware module, such as when additional field devices are added into the plant and powered on. In these scenarios, the method 300 may include automatically initiating the discovery of the newly connected particular component (block 308) upon the detection of the new, communicative connection to the pluggable DCS hardware module.

At a block 310, the method 300 includes automatically populating, based on the discovery of the one or more physical components by the each pluggable DCS hardware module, at least a portion of a plant information model of the DCS, such as the plant information model 18, 225. The plant information model includes a description of a control framework of the industrial process plant and a description of a control network which is utilized to control the industrial process during the run-time operations of the industrial process plant, where both descriptions are represented or defined within the plant information model using a common or same modeling language. The control framework defines respective logical control identifiers of control components of the DCS and hierarchical relationships among the control components, which include the field device. The control network includes the field device, the respective interface port, and a control routine provided at the each pluggable DCS hardware module, as well as other control components (and optionally networking components) that are utilized in process control of the industrial process plant. As such, the plant information model, when populated, stores descriptions of control loops and other control-related components, entities, and combinations/groupings thereof that are utilized to control the industrial process within the industrial process plant.

In some embodiments, the plant information model further includes a description of one or more physical components to which the pluggable DCS hardware module is communicatively connected, respective locations within the industrial process plant of the one or more physical components, and respective interconnections among the one or more physical components. Generally, the one or more physical components are disposed in a field environment of the industrial process plant; however, in some configurations, at least one physical component may be disposed elsewhere, such as in a back-end environment or a remote environment of the industrial process plant. At any rate, the plant information model may represent or define the description of the one or more physical components of the industrial process plant and associated locations and interconnections by using the common or same modeling language used to represent the control framework and control network of the industrial process plant.

In some embodiments, a set of Application Programming Interfaces (APIs) is provided in conjunction with the plant information model. The set of APIs may be exposed to functions and applications so that the functions and applications may access information stored in the plant information model. As such, the set of APIs may be implemented using the same or common modeling language that is used to define or represent the information stored in the plant information model.

At a block 312, the method 300 includes executing, by the each pluggable DCS hardware module, the control routine and the respective I/O data delivery mechanism bound to the respective interface port to deliver data between the field device and the control routine during run-time operations of the industrial process plant to thereby control the industrial process. That is, block 312 includes executing the control loop comprising the field device, the respective interface port, and the control routine during run-time of the industrial process plant to thereby control the industrial process.

In some embodiments, the DCS includes an initial set of control functions that has been stored onto the memories of the set of pluggable, interchangeable DCS hardware modules prior to an initialization or powering up of the DCS. The initial set of control functions may include, for example, an adaptive control function, an event-based control function, an advanced control function, a regulatory control function, a batch control function, a sequencing function, an interlock function, a safety shutdown function, a state detection function, a real-time virtualized controller, and/or a back-up virtualized controller. In these embodiments, the method 300 may include (not shown in FIG. 3) automatically generating the control routine corresponding to the field device (and/or automatically generating other control routines executed by the DCS) based on the initial set of control functions and the plant information model. For example, various initial control functions may be combined and configured with logical control identifiers, parameters, and values from the plant information model to generate a control routine.

The DCS may assign various control routines that the DCS has automatically generated to execute on respective pluggable DCS hardware modules. For example, the DCS may package a specific control routine into a container, and assign the container to run on a specific pluggable DCS hardware module. Alternatively, an instance of the control routine may be provided to a specific pluggable DCS hardware module for execution. The DCS may re-allocate assignments of control routines or containers to respective pluggable DCS hardware modules during run-time operations of the industrial process plant, e.g., automatically based on a change in a load, a size, a performance metric, and/or a fault of one or more DCS hardware modules of the set. The change may be a detected change or a predicted change, for example. In this manner, advantageous features such as automatic load leveling across the set of DCS hardware modules and/or live migration of various control routines may be accomplished.

In some embodiments, the DCS includes an initial set of I/O data delivery functions that has been stored onto the memories of the set of pluggable, interchangeable DCS hardware modules prior to an initialization or powering up of the DCS. The initial set of I/O data delivery functions may include, for example, an analog I/O function, a discrete I/O function, a motion I/O function, a near-infrared (NIR) I/O function, another type of I/O transport function, a sampling function, and/or a signal conditioning function. In these embodiments, the method 300 may include (not shown in FIG. 3) automatically generating at least some of the respective I/O data delivery mechanisms corresponding to interface ports of various pluggable DCS hardware modules of the DCS based on the initial set of I/O data delivery functions and the plant information model. For example, various initial I/O data delivery functions may be combined and configured with logical control identifiers, parameters, and values from the plant information model to generate an I/O data delivery mechanism.

The DCS may assign various I/O data delivery mechanisms that the DCS has automatically generated to execute on respective pluggable DCS hardware modules. For example, the DCS may package a specific I/O data delivery mechanism into a container, and assign the container to run on a specific pluggable DCS hardware module. Alternatively, an instance of the I/O data delivery mechanism may be provided to a specific pluggable DCS hardware module for execution. The DCS may re-allocate assignments of I/O data delivery mechanisms or containers to respective pluggable DCS hardware modules during run-time operations of the industrial process plant, e.g., automatically based on a change in a load, a size, a performance metric, and/or a fault of one or more DCS hardware modules of the set. The change may be a detected change or a predicted change, for example. In this manner, advantageous features such as automatic load leveling across the set of DCS hardware modules and/or live migration of various I/O data delivery mechanisms may be accomplished.

In some embodiments (not shown in FIG. 3), the DCS includes an initial set of support functions that has been stored onto the memories of the set of pluggable, interchangeable DCS hardware modules prior to an initialization or powering up of the DCS. The initial set of support functions may include functions that are not utilized directly in process control, but that otherwise may operate on data generated by the industrial process plant during run-time process control to generate outputs which provide information and/or which may affect various control routines. Examples of support functions include (but are not limited to) a signal processing function, an alarming function, a history function, a trend function, a diagnostic function, a descriptive analytics function, a predictive analytics function, a machine learning function, a reinforced learning function, a bus function, and a user interface function. In these embodiments, the method 300 may include (not shown in FIG. 3) automatically generating an additional support function based on the initial set of support functions and the plant information model. For example, a trend function, an alarm function, and a user interface function may be combined to generate an additional support function to monitor outputs of various control components defined in the plant information model. In some arrangements, an output of an initial support function and/or an output of an additional, automatically generated support function may be provided as input(s) to a control routine run-time operations of the industrial process plant, to thereby affect the behavior of direct process control. For example, an analytics routine, upon reaching some threshold, may generate a control signal that is provided to one or more control routines to automatically adjust the process.

Any or all of the initial set of control functions, initial set of I/O delivery mechanisms, and initial set of support functions may be stored in the set of pluggable, DCS hardware modules a priori, e.g., prior to an initialization of the DCS and/or of each pluggable DCS hardware module. For example, the initial set of control functions, the initial set of I/O data delivery mechanisms, and the initial set of support functions may be stored in a generic framework of the DCS, such the generic framework 22 of FIG. 1 or the generic framework 220 of FIG. 2. Additionally, a set of Application Programming Interfaces (APIs) may be provided by the pluggable DCS hardware module(s) 200 and exposed to other functions and applications so that the other functions and applications may access the initial sets of control functions, I/O data delivery mechanisms, and/or support functions. In an embodiment, the set of APIs utilized to access the generic framework may be the set of APIs utilized to access the plant information model. As such, the set of APIs may be implemented using the same or common modeling language that is used to define or represent the information stored in the plant information model. For example, the set of APIs may be the set of APIs 20 or 222.

The set of functions and applications of the DCS to which access to the plant information model and/or generic framework is provided may include, for example, one or more of the discovery engine 215, the execution engine 218, the control routines 228, or the I/O data delivery mechanisms 230 of FIG. 2, and/or any routines, mechanisms, algorithms, containers, etc. which are run or executed on the control cluster 28, the I/O cluster 30, and/or other compute clusters 31 of FIG. 1. In some configurations, the DCS further includes one or more security applications which secure the contents of the plant information model and/or access to the plant information model. Typically, such security applications may be stored onto the memories of the set of pluggable DCS hardware module prior to an initialization or powering up of the DCS and/or of each pluggable DCS hardware module. In some embodiments, applications and functions of the DCS to which access to the plant information model and/or generic framework is provided may include, for example, operator assist engines and/or control assist engines 35. Additionally or alternatively, the set of functions and applications of the DCS to which access to the plant information model and/or generic framework is provided may include applications and functions 40 stored in a plant application library, such as the library 45, where the applications stored in the plant application library may include applications which have automatically generated by the DCS (e.g., in a manner such as described above), applications which have been manually generated via a user interface 32a, 52, applications including third-party extensions 40b, etc.

As discussed above, in embodiments, a DCS may include a plurality of pluggable, interchangeable DCS hardware modules. As such, in these embodiments with regard to automatic discovery 308, the method 300 may further include detecting, by a first pluggable DCS hardware module, a second pluggable DCS hardware module of the DCS upon the establishment of a communicative connection between the first and the second pluggable DCS hardware modules. In these configurations, multiple pluggable DCS hardware modules may cooperate to distributively store information, data, functionalities, etc. among the multiple pluggable DCS hardware modules. For example, the multiple pluggable DCS hardware module may distributively store, among their respective memories, the plant information model, the generic framework, the set of APIs exposed to applications and functions, one or more control routines, one or more I/O delivery mechanisms, the plant application library, one or more applications (e.g., operator interfaces, assist engines, etc.), and the like. Not all information need be distributively stored or not distributively stored, though. In an example configuration, the plant information model may be stored at a first pluggable DCS module, a back-up copy of the plant information model may be stored at a second pluggable DCS module, instances of some control routines may be stored at two or more pluggable DCS modules, and operator interface applications may be distributively stored among the entire set of pluggable DCS modules. Further, the DCS (e.g., via one or more pluggable DCS hardware modules) may automatically redistribute the allocation of information, data, functionalities, applications, etc. among the set of DCS pluggable hardware modules responsive to a change in one or more of the DCS pluggable hardware modules, such as a change to a load, a size, or a performance metric, the occurrence of a fault, planned maintenance, and the like. The DCS may perform the automatic redistribution based on a predicted change or on a detected change, for example.

When implemented in software, any of the applications, modules, etc. described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The particular features, structures, and/or characteristics of any specific embodiment may be combined in any suitable manner and/or in any suitable combination with one and/or more other embodiments, including the use of selected features with or without corresponding use of other features. In addition, many modifications may be made to adapt a particular application, situation and/or material to the essential scope or spirit of the present invention. It is to be understood that other variations and/or modifications of the embodiments of the present invention described and/or illustrated herein are possible in light of the teachings herein and should be considered part of the spirit or scope of the present invention. Certain aspects of the invention are described herein as exemplary aspects.

What is claimed:

1. An industrial distributed process control system (DCS) of an industrial process plant, the industrial DCS comprising:
    one or more processors;
    one or more tangible, non-transitory memories; and
    a discovery engine comprising first computer-executable instructions that are stored on the one or more tangible, non-transitory memories and that, when executed by the one or more processors, cause each module of a plurality of modules of the industrial DCS to populate a respective at least a portion of a plant information model,
        the population of the respective at least the portion of the plant information model based on a discovery, by the each module, of respective communicative connections of one or more components of the industrial DCS to the first module, and
        the plant information model including a description of a control framework of the industrial process plant and a description of a control network of the industrial process plant utilized to control the industrial process during run-time operations of the industrial process plant; and
    an execution engine comprising second computer-executable instructions that are stored on the one or more tangible, non-transitory memories and that, when executed by the one or more processors, cause the industrial DCS to execute, via the each module and based on the populated at least the portion of the plant information model, a control routine to thereby deliver data between the control routine and a field device to thereby control an industrial process during run-time operations of the industrial process plant, the control routine and the field device included in the control network.

2. The industrial DCS of claim 1, wherein the one or more components include at least one of: an Input/Output (I/O) port, an I/O port type, a field device, another physical device or physical equipment disposed a field environment of the industrial process plant, a process controller, a safety controller, a control routine, a networking device, another module, or a connection of a component.

3. The industrial DCS of claim 1, further comprising additional computer-executable instructions that are stored on the tangible, non-transitory memories and that are executable by the one or more processors to cause the industrial DCS to:
    generate, responsive to the discovery of the respective communicative connections of the one or more components, at least one of: the control routine or another control routine;
    instantiate the at least one of the control routine or the another control routine into a respective control container; and
    allocate the instantiated, respective control container to one or more compute modules of the industrial DCS for execution during the run-time operations of the industrial process plant.

4. The industrial DCS of claim 1, further comprising additional computer-executable instructions that are stored on the tangible, non-transitory memories and that are executable by the one or more processors to cause the industrial DCS to:
    generate, responsive to the discovery of the one or more components, an Input/Output (I/O) data delivery mechanism;
    instantiate the I/O data delivery mechanism into a respective I/O container; and
    allocate the respective I/O container to one or more compute modules of the industrial DCS for execution during the run-time operations of the industrial process plant.

5. The industrial DCS of claim 1, further comprising additional computer-executable instructions that are stored on the tangible, non-transitory memories and that are executable by the one or more processors to cause the industrial DCS to:
    generate, responsive to the discovery of the one or more components, Human Machine Interface (HMI) functionality of the industrial DCS;
    instantiate the HMI functionality into a respective HMI container; and
    allocate the respective HMI container to one or more compute modules of the industrial DCS for execution during run-time operations of the industrial process plant.

6. The industrial DCS of claim 1, wherein the plurality of modules includes a hardware module of the industrial DCS.

7. The industrial DCS of claim 1, wherein the control framework defines respective logical control identifiers of control components of the DCS and hierarchical relationships among the control components, and the control components include the field device and the control routine.

8. The industrial DCS of claim 1,
    further comprising a set of Application Programming Interfaces (APIs) that are exposed to a plurality of applications of the industrial DCS to thereby provide the plurality of applications access to the plant information model and to secure contents of the plant information model; and
    wherein the plurality of applications includes the control routine and at least one of: another control routine application, an I/O data delivery application, a Human Machine Interface (HMI) application, a support function application, or an application associated with a third-party.

9. The industrial DCS of claim 1, wherein the discovery engine automatically discovers or detects the one or more components, and the population of the respective at least the portion of the plant information model is responsive to the automatic discovery.

10. The industrial DCS of claim 1, further comprising a packet network interconnecting a field environment of the industrial DCS and a cloud computing component of the DCS, and wherein the field device is disposed in the field environment and the control routine executes in the cloud computing component.

11. A method performed by an industrial distributed process control system (DCS) of an industrial process plant, the method comprising:
    discovering, by a first module executing in the industrial DCS, respective communicative connections of one or more components of the industrial DCS to the first module;
    responsive to the discovering, populating, by the first module, at least a portion of a plant information model, the plant information model including a description of a control framework of the industrial process plant and a description of a control network of the network of the industrial process plant utilized to control the industrial process during run-time operations of the industrial process plant; and utilizing the first module and a second module to execute, based on the populated at least the portion of the plant information model, a control routine included in the control network to thereby deliver-data between a field device and the control routine, thereby controlling an industrial process during run-time operations of the industrial process plant.

12. The method of claim 11, wherein:
the discovering, by the first module, of the respective communicative connections of the one or more components to the first module includes automatically detecting, by the first module, the respective communicative connections of the one or more components to the first module; and
the one or more components include at least one of: an Input/Output (I/O) port, an I/O port type, a field device, another physical device or physical equipment disposed a field environment of the industrial process plant, a process controller, a safety controller, a control routine, a networking device, another module, or a connection of a component.

13. The method of claim 11, further comprising:
automatically generating, by the industrial DCS and by utilizing the plant information model, one or more applications utilized by the industrial DCS;
instantiating the one or more applications into respective containers; and
assigning each application of the one or more instantiated applications to execute on a respective one or more compute modules of the industrial DCS during the run-time operations of the industrial process plant.

14. The method of claim 13, wherein the assigning of the each application of the one more instantiated applications to execute on the respective one or more compute modules assigning a first instantiated application to execute on one or more compute modules disposed at a physical location at which the field device is disposed.

15. The method of claim 13, wherein the assigning of the each application of the one more instantiated applications to execute on the respective one or more compute modules assigning a second instantiated application to execute on one or more compute modules of a cloud computing component of the industrial DCS, the cloud computing component disposed remotely from a physical location at which the field device is disposed.

16. The method of claim 13, wherein at least one of:
(i) the one or more applications include a control routine, and the method further comprises executing, during the run-time operations of the industrial process plant, the instantiated control routine on the respective one or more compute modules to which the instantiated control routine was assigned to thereby control the industrial process;
(ii) the one or more applications include an Input/Output (I/O) data delivery mechanism, and the method further comprises executing, during the run-time operations of the industrial process plant, the instantiated I/O data delivery mechanism on the respective one or more compute modules to which the instantiated I/O data delivery mechanism was assigned to thereby control the industrial process; or
(iii) the one or more applications include Human Machine Interface (HMI) functionality of the industrial DCS, and the method further comprises executing, during the run-time operations of the industrial process plant, the HMI functionality on the respective one or more compute modules to which the instantiated HMI functionality was assigned.

17. The method of claim 11, wherein the first module includes a hardware module of the industrial DCS.

18. The method of claim 11, wherein at least one of the first module or the second module includes a respective application executing on respective one or more compute modules of the industrial DCS.

19. The method of claim 11, wherein utilizing the first module and the second module to execute the control routine based on the populated at least the portion of the plant information model includes accessing the populated at least the portion of the plant information model via a set of Application Programming Interfaces (APIs) provided by the industrial DCS.

20. The method of claim 19,
further comprising exposing, by the industrial DCS, one or more respective APIs of the set of APIs to each application of a plurality of applications executing at the industrial DCS, thereby providing, to the each application, access to a respective portion of the plant information model; and
wherein the plurality of applications includes at least one of a control routine application, an I/O data delivery application, a Human Machine Interface (HMI) application, or an application associated with a third-party.

* * * * *